United States Patent
Cole et al.

(10) Patent No.: US 10,871,884 B1
(45) Date of Patent: Dec. 22, 2020

(54) PRODUCT IMAGE CHARACTERISTIC DETECTION AND MANIPULATION

(71) Applicant: Amazon Technologies, Inc., Seattle, WA (US)

(72) Inventors: David Robert Cole, Brier, WA (US); Joon Hao Chuah, Seattle, WA (US); Brian James Mount, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 15/916,995

(22) Filed: Mar. 9, 2018

(51) Int. Cl.
  *G06T 11/60*  (2006.01)
  *G06F 3/0484* (2013.01)
  *G06K 9/32*   (2006.01)

(52) U.S. Cl.
  CPC ....... *G06F 3/04845* (2013.01); *G06K 9/3241* (2013.01); *G06T 11/60* (2013.01); *G06T 2207/20132* (2013.01)

(58) Field of Classification Search
  CPC .................................................. G06F 3/04845
  See application file for complete search history.

(56) References Cited

U.S. PATENT DOCUMENTS

| | | | | |
|---|---|---|---|---|
| 2003/0021468 A1* | 1/2003 | Jia | ........................... | G06T 11/60 382/162 |
| 2005/0001986 A1* | 1/2005 | Matsuda | ................ | G09G 3/002 353/31 |
| 2005/0213125 A1* | 9/2005 | Smith | ..................... | G06T 5/009 358/1.9 |
| 2006/0109488 A1* | 5/2006 | Park | ....................... | G06F 3/1205 358/1.1 |
| 2009/0002517 A1* | 1/2009 | Yokomitsu | ......... | G06K 9/00771 348/223.1 |
| 2010/0107120 A1* | 4/2010 | Sareen | ................ | G06F 3/04845 715/821 |
| 2010/0118179 A1* | 5/2010 | Ciudad | .............. | H04N 5/23222 348/371 |
| 2011/0216966 A1* | 9/2011 | Cok | ....................... | G06T 11/001 382/162 |
| 2012/0081012 A1* | 4/2012 | Van De Sluis | ........... | G01J 3/10 315/158 |
| 2014/0267367 A1* | 9/2014 | Chong | .................. | G06T 11/001 345/595 |

* cited by examiner

Primary Examiner — Jitesh Patel
(74) Attorney, Agent, or Firm — Athorus, PLLC

(57) ABSTRACT

Systems and methods related to detecting characteristics of images and accentuating or manipulating characteristics of images are described. For example, a principal color of an image may be identified, a complement color may be determined based on the principal color, and the complement color may be applied to the image to accentuate the image. In this manner, an object of interest represented in the image may be emphasized and displayed in a more visually attractive manner. In addition, edges of an image may be evaluated to determine if one or more visibly cropped edges are present within the image, the image may be further cropped to remove the visibly cropped edges, and/or the image may be shifted or magnified based on such cropped edges. In this manner, an object of interest represented in the image may be magnified and emphasized, and visually distracting elements may be removed from the image.

16 Claims, 16 Drawing Sheets

| Principal Color | Complement | Fashion Complement | Children's Complement |
|---|---|---|---|
| 0 (Red) | 180,0,1,0.9 | 150,0.05,0.95 | 180,0.1,0.9 |
| 30 | 210,0,1,0.9 | 210,0.05,0.95 | 180,0.1,0.9 |
| 60 (Yellow) | 240,0,1,0.9 | 210,0.05,0.95 | 240,0.1,0.9 |
| 90 | 270,0,1,0.9 | 270,0.05,0.95 | 240,0.1,0.9 |
| 120 (Green) | 300,0,1,0.9 | 270,0.05,0.95 | 300,0.1,0.9 |
| 150 | 330,0,1,0.9 | 330,0.05,0.95 | 300,0.1,0.9 |
| 180 (Cyan) | 0,0,1,0.9 | 330,0.05,0.95 | 0,0.1,0.9 |
| 210 | 30,0,1,0.9 | 30,0.05,0.95 | 0,0.1,0.9 |
| 240 (Blue) | 60,0,1,0.9 | 30,0.05,0.95 | 60,0.1,0.9 |
| 270 | 90,0,1,0.9 | 90,0.05,0.95 | 60,0.1,0.9 |
| 300 (Magenta) | 120,0,1,0.9 | 90,0.05,0.95 | 120,0.1,0.9 |
| 330 | 150,0,1,0.9 | 150,0.05,0.95 | 120,0.1,0.9 |

FIG. 6

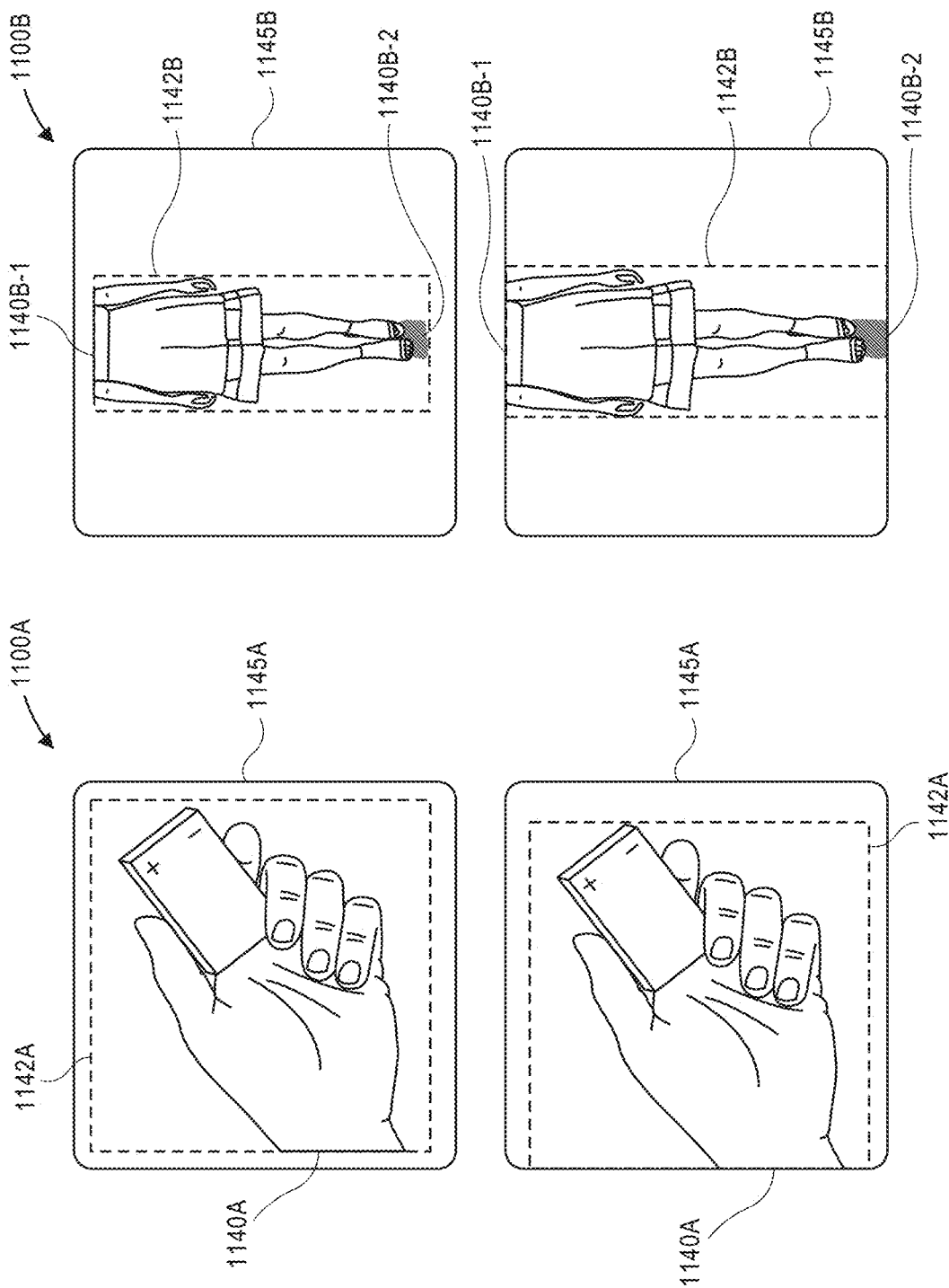

PRODUCT IMAGE CHARACTERISTIC DETECTION AND MANIPULATION

BACKGROUND

Images may be displayed via computing or display devices in various formats. For example, images of products may be shown on a white background so as not to distract a viewer from the products displayed. In addition, extraneous portions of images may be visibly cropped or removed to try to direct the attention of a viewer to the products displayed. However, poorly or visibly cropped images of products on starkly white backgrounds may distract or lose the attention of a viewer over time, particularly if multiple such images are displayed for a user simultaneously. Accordingly, there is a need for systems and methods to manipulate and accentuate portions of displayed images in order to better attract and maintain the attention of a viewer.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 is a schematic table of example complement colors associated with principal colors, according to an implementation.

FIG. 11A is a schematic diagram of an example tenth image within which an edge may be detected and manipulated, according to an implementation.

FIG. 11B is a schematic diagram of an example eleventh image within which an edge may be detected and manipulated, according to an implementation.

Figure 1B:
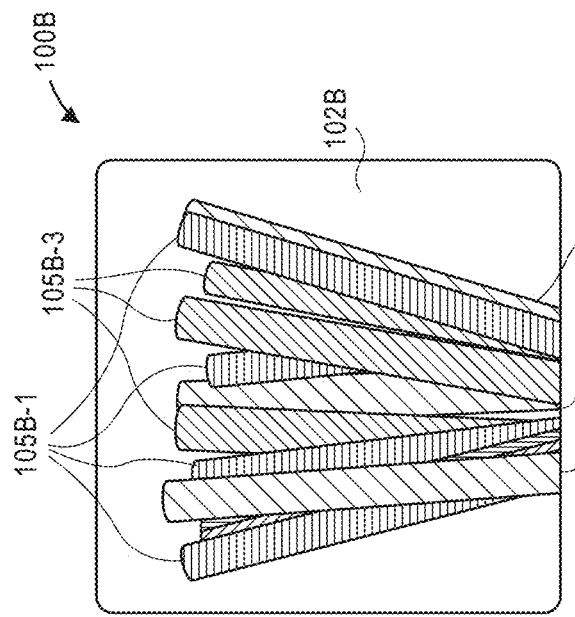
FIG. 1B is a schematic diagram of an example second image within which a principal color may be determined, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to detect aspects or characteristics of images and to accentuate or manipulate aspects or characteristics of the images are described. In example embodiments, one or more principal colors within an image may be detected, and one or more complement colors may be applied to the image to accentuate an object represented within the image. In other example embodiments, one or more edges of an image may be detected, and the one or more edges may be manipulated to further accentuate an object represented within the image.

In example embodiments, one or more principal colors within an image may be detected. For example, all color values of all pixels of an image may be detected in order to determine one or more principal colors. In addition, various object recognition algorithms may be performed to identify one or more objects within an image, and color values of those pixels associated with the identified one or more objects may be detected in order to determine one or more principal colors. Further, one or more subregions of an image may be determined, and color values of those pixels associated with the one or more subregions may be detected in order to determine one or more principal colors.

Histogram analysis may be used to analyze the color values of pixels within an image. For example, the most frequently occurring color values of pixels may be identified from a histogram and determined to be the one or more principal colors of the image. In addition, other aspects of color may be used individually or in combination to determine one or more principal colors from color values of pixels. For example, color values may be defined in terms of a hue-saturation-lightness (HSL) color model, and one or more of hue, saturation, and lightness values of the pixels may be used to determine one or more principal colors. Likewise, color values may be defined in terms of a hue-saturation-value (HSV) color model, and one or more of hue, saturation, and value values of the pixels may be used to determine one or more principal colors. Further, color values may be defined in terms of other color models, such as a red-green-blue (RGB) color model in which colors are defined having values between 0-0-0 and 255-255-255, a hexadecimal color model in which colors are defined having values between #000000 and #FFFFFF, or other color models. Moreover, one or more of the color models may be represented as color wheels, either two-dimensional or three-dimensional, or as other visual graphs or models.

When object recognition algorithms are used to identify one or more objects within an image, other information may also be used to aid the object recognition algorithms. For example, information associated with the image may indicate a category, type, color, name, brand, size, or other information or metadata associated with an object represented in the image. Further, one or more other objects such as background objects, human body objects such as arms, hands, legs, or faces, or additional objects other than objects of interest represented within an image may also be identified, and color values of pixels associated with such other objects may be excluded from the determination of one or more principal colors.

The one or more subregions of an image may be identified based on expected positions of objects of interest represented in an image, e.g., in the center of the image, in order to determine one or more principal colors. In addition, the one or more subregions may also include areas of an image in which text elements, user interface elements, or other elements may be added to, placed on, or superimposed over such subregions, so that one or more principal colors may be determined within the one or more subregions, and any text elements, user interface elements, or other elements to be added to or superimposed over those subregions may be clearly visible and/or accentuated for a viewer.

Upon determining the one or more principal colors within an image, one or more complement colors may be identified based at least in part on the one or more principal colors. For example, a complement color may be defined as a color that is opposite the principal color on a color wheel, such as a color that is 180 degrees from the principal color on an HSL or HSV color wheel. In addition, the complement color may be defined as any other color relative to the determined principal color and having various aspects of color values, based on any one or more of various color models.

Further, in some example embodiments, a table or database may be defined in which one or more principal colors are associated with one or more complement colors. In such examples, a principal color within the table or database having color values that are closest to the determined principal color within the image may be identified, and the complement color associated with the closest principal color may be identified. Moreover, a plurality of tables or databases may be defined in which one or more principal colors are associated with a respective plurality of complement colors. For example, information associated with an image may indicate a category, type, color, name, brand, size, or other information or metadata associated with an object represented in the image, and such information may further be associated with one of the plurality of complement colors that are associated with a principal color. As an example, if the image or object includes category or type information related to "fashion," a first set of complement colors, e.g., generally neutral colors, may be associated with one or more principal colors in a first table or database. As another example, if the image or object includes type, name, or brand information related to "children's toys," a second set of complement colors, e.g., generally primary colors, may be associated with one or more principal colors in a second table or database.

In addition, a complement color may also be identified based on various other factors. For example, user preferences related to color values or aspects, user inputs received by computing or display device, user information such as color blindness or sensitivity, computing device information related to display characteristics or capabilities, and/or other user or device characteristics may additionally be used to identify a complement color associated with a principal color.

Upon identifying a complement color based at least in part on the one or more principal colors, the complement color may be applied to at least a portion of the image. In example embodiments, the complement color may be defined in terms of the HSV color model, and have a hue value that is 180 degrees from a hue value of the principal color, a saturation level that is relatively low, e.g., 0.1 or lower on scale of 0 to 1, and a value level that is relatively high, e.g., 0.9 or higher on scale of 0 to 1. In other example embodiments, the complement color may be defined in terms of the RGB color model, and have various values of red, green, and blue between 0 and 255, e.g., a red value of 240, a green value of 240, and a blue value of 250. In addition, the complement color may have an opacity of between approximately 1% and approximately 5%, or up to approximately 10% in some embodiments. Further, the complement color may have one or more defined values or ranges associated with transparency, translucency, or other characteristics of colors.

For example, a tile having the complement color may be overlaid onto the image. In other example embodiments, one or more portions of the image may be overlaid with one or more tiles having the complement color. In this manner, when overlaid over a white or very light portion of an image, the complement color may apply a very light tint of the hue value to the white or very light portion of the image. Likewise, when overlaid over an object having the principal color within the image or darker portions of the image, the complement color may also apply a very light tint of the hue value to the object having the principal color or darker portions of the image, which may have the effect of being nearly imperceptibly or negligibly altered.

In still other example embodiments, color values or aspects of pixels of the image may be altered, adjusted, or modified based at least in part on color values or aspects of the complement color. For example, all pixels of the image may have modified color values or aspects. In addition, only a portion of pixels of the image, e.g., only pixels having color values above a threshold color value, only white or off-white pixels, only pixels that are not associated with an identified object within the image, or any other portion of pixels, may have modified color values or aspects. In examples in which the color values of pixels are defined in terms of an RGB color model, the complement color may have particular values of red, green, and blue between 0 and 255, and a difference between each of the red, green, and blue color values of the complement color and each of the red, green, and blue color values of white, e.g., 255-255-255, may be calculated. Then, for each pixel of the image to be modified, the calculated difference for each of the red, green, and blue color values may be subtracted from the red, green, and blue color values of the pixel.

By detecting a principal color within at least a portion of an image, identifying a complement color based at least in part on the principal color, and applying the complement color to at least a portion of the image, the image may be accentuated such that an object, item, or product of interest represented in the image may attract and/or maintain the attention of a viewer.

Further, in a user interface in which a plurality of images are displayed simultaneously and/or adjacent one another, principal colors of each of the plurality of images may be determined, complement colors may be identified for each of the determined principal colors of the plurality of images, and the identified complement colors may be applied to each of the plurality of images. In this manner, the plurality of images that are displayed simultaneously and/or adjacent one another may have different applied complement colors, thereby further attracting and/or maintaining the attention of a viewer.

In some embodiments of user interfaces having a plurality of images displayed simultaneously and/or adjacent one another, the plurality of images may be rearranged or reordered based at least in part on the applied complement colors. For example, images having similar complement colors may be rearranged near or adjacent one another to create a more unified appearance for the user interface. In other embodiments, images having different complement colors may be rearranged near or adjacent one another to create a more varied appearance for the user interface.

In still further embodiments, a system or environment may include a user interface and a computing system having a processor and a memory to detect a principal color within at least a portion of an image displayed via the user interface, identify a complement color based at least in part on the principal color, and apply the complement color to at least a portion of the image displayed via the user interface. In addition, the system may include at least one illumination element, e.g., a connected light bulb or other connected illumination element, that is illuminated based at least in part on the complement color. Further, the system may also include at least one sensor, e.g., a light or image sensor, an audio sensor, a connected device, a smart home device, a voice input device, or other sensor, to determine a time of day, an ambient light color value, an ambient light brightness level, and/or other aspects of the environment, and the at least one illumination element may be illuminated further based on the detected environment or ambient light characteristics.

In addition to the accentuation of images with complement colors based on determined principal colors within an image, the determined principal colors may also be used for other applications. For example, if a user searches or filters images based on a color selection, images matching the search or filter criteria may be analyzed to determine one or more principal colors within the image, in order to provide only those images that include the color selection as one of the principal colors within the images. In this manner, erroneous search or filter results, e.g., if an image is erroneously categorized as including a red shoe even though the image actually includes a blue shoe, may not be provided to a user who searched for red shoes, thereby improving the user's experience.

In other example applications, a metric related to image color quality may be defined based on one or more aspects of color values of pixels within an image. Images may be analyzed to determine one or more principal colors within the images, and the principal colors may then be compared to the metric of image color quality to make a determination as to the overall quality of the images. The metric related to image color quality may be based on any individual aspect of color values or on any combination of the various aspects of color values, according to one or a combination of various color models.

In still further example embodiments, one or more edges of an image and any objects represented therein may be analyzed to determine whether portions of the objects represented therein include cropped edges. For each edge of an image, if it is determined that portions of the objects represented therein include cropped edges, then the edge of the image may be further cropped to coincide with the determined cropped edges of portions of the objects. Likewise, for each edge of an image, if it is determined that portions of objects represented therein do not include cropped edges, then the edge of the image may be maintained uncropped.

The determination of whether portions of objects represented within an image include cropped edges may be based on color values of pixels along edges of the image, numbers of pixels having particular color values along edges of the image, other color values or aspects of pixels, or combinations thereof. For example, the color values of pixels along edges of the image may be compared to one or more threshold color values. In addition, the numbers of pixels having particular color values along edges of the image may be compared to one or more threshold values related to the numbers of pixels. Further, other threshold values related to other color values or aspects of pixels may also be used to determine whether portions of objects represented within an image include cropped edges.

Upon evaluating all the edges of an image, if any of the edges have been further cropped to coincide with the determined cropped edges of portions of the objects, then the image and objects represented therein may be modified, e.g., magnified and/or translated, while maintaining an aspect ratio of the image and objects represented therein, to maximize use of the available space for the image. In this manner, images may be manipulated to further accentuate objects or items represented in the image by reducing unused space within the image, eliminating unnecessary portions of the image that may distract the attention of the viewer or detract from an experience of a user, and magnifying objects or items of interest represented in the image to better attract and/or maintain the attention of the viewer.

As one skilled in the art will appreciate in light of this disclosure, certain embodiments may be capable of achieving certain advantages, including some or all of the following: improving and simplifying user interfaces and user experiences with such interfaces by visually accentuating and/or manipulating images and objects represented therein, quickly and efficiently determining and applying complement colors within images displayed via user interfaces to improve and simplify user experiences with such interfaces, quickly and efficiently detecting and manipulating edges of images displayed via user interfaces to improve and simplify user experiences with such interfaces, providing only relevant results in response to user search queries or filter criteria based on color selections, improving and simplifying user interfaces such that users may more quickly and efficiently locate, access, and/or navigate desired data stored in, and functions of applications included in, electronic or computing devices, improving and simplifying user interfaces and user experiences with such interfaces by including only images of high quality and excluding images of low quality, etc.

Figure 1C:
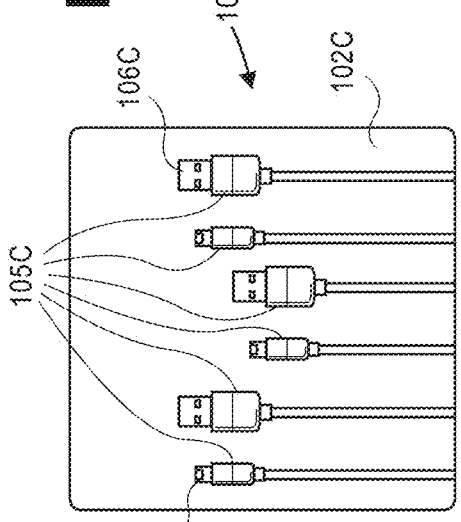
FIG. 1C is a schematic diagram of an example third image within which a principal color may be determined, according to an implementation.
Figure 1A:
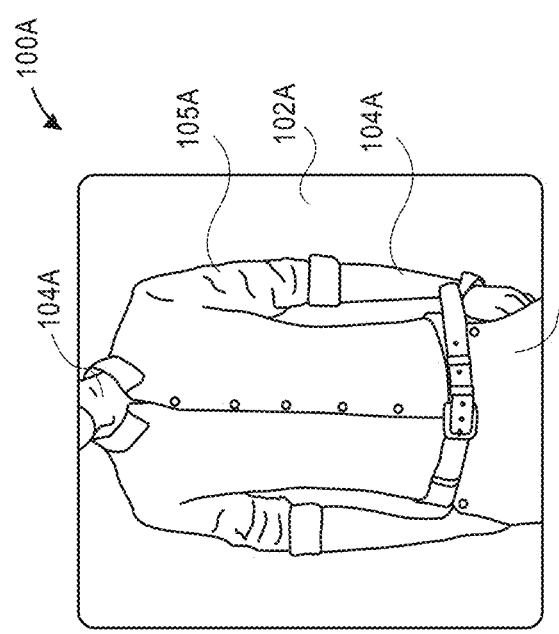
FIG. 1A is a schematic diagram of an example first image within which a principal color may be determined, according to an implementation.

FIG. 1A is a schematic diagram of an example first image 100A within which a principal color may be determined, according to an implementation.

The first image 100A may include a background 102A and one or more objects of interest, e.g., a shirt 105A worn by a person. In addition to the shirt 105A, the image 100A may also include human body objects 104A, such as arms, hands, neck, or face, and other objects, e.g., pants 106A worn by the person. As shown in FIG. 1A, the shirt 105A may be the primary object of interest within the image 100A, and in an example embodiment, the shirt 105A may have a generally red color, the pants 106A may have a generally dark blue color, the human body objects 104A may have any of various skin tones or colors (which colors may be different from or the same as colors of other objects within an image), and the background 102A may have a generally white color.

In order to determine a principal color associated with the image 100A, color values of all pixels of the image 100A may be determined. In some example embodiments, the generally red color of the shirt 105A may be determined to be the principal color of the image 100A, e.g., based on a comparison of the number of pixels having color values that are generally red as compared to numbers of pixels having different color values. In other example embodiments, color values of pixels that are generally white, off-white, or any of various skin tones or colors may not be considered as part of the determination of the principal color of image 100A, e.g., based on an assumption that such white, off-white, or any of various skin tones or colors are likely associated with a white background 102A or human body objects 104A.

FIG. 1B is a schematic diagram of an example second image 100B within which a principal color may be determined, according to an implementation.

The second image 100B may include a background 102B and one or more objects of interest, e.g., children's drink straws 105B. As shown in FIG. 1B, the straws 105B may be the primary objects of interest within the image 100B, and in an example embodiment, the straws 105B-1 may have a generally blue color, the straws 105B-2 may have a generally yellow color, the straws 105B-3 may have a generally red color, and the background 102B may have a generally white color.

In order to determine one or more principal colors associated with the image 100B, color values of all pixels of the image 100B may be determined. In some example embodiments, the generally blue color of the straws 105B-1 may be determined to be the principal color of the image 100B, e.g., based on a comparison of the number of pixels having color values that are generally blue as compared to numbers of pixels having different color values. In other example embodiments, the generally blue color of the straws 105B-1 and the generally red color of the straws 105B-3 may both be determined to be principal colors of the image 100B, e.g., based on the numbers of pixels having color values that are generally blue and generally red being approximately equal. In addition, one of the principal colors may be chosen, e.g., at random, based on additional information or metadata associated with the image, based on user preferences, characteristics, or inputs, and/or based on additional information or color values of other images displayed simultaneously and/or side-by-side with the image, to be the principal color of the image 100B. Further, color values of pixels that are generally white or off-white may not be considered as part of the determination of the principal color of image 100B, e.g., based on an assumption that such white or off-white color values are likely associated with a white background 102B.

FIG. 1C is a schematic diagram of an example third image 100C within which a principal color may be determined, according to an implementation.

The third image 100C may include a background 102C and one or more objects of interest, e.g., electrical cables 105C. In addition to the cables 105C, the image 100C may also include electrical connectors 106C. As shown in FIG. 1C, the cables 105C may be the primary objects of interest within the image 100C, and in an example embodiment, the cables 105C may have a generally red color, the connectors 106C may have a generally silver color, and the background 102C may have a generally white color.

In order to determine one or more principal colors associated with the image 100C, color values of all pixels of the image 100C may be determined. In some example embodiments, the generally red color of the cables 105C may be determined to be the principal color of the image 100C, e.g., based on a comparison of the number of pixels having color values that are generally red as compared to numbers of pixels having different color values. In other example embodiments, color values of pixels that are generally white or off-white may not be considered as part of the determination of the principal color of image 100C, e.g., based on an assumption that such white or off-white color values are likely associated with a white background 102C.

Figure 2B:
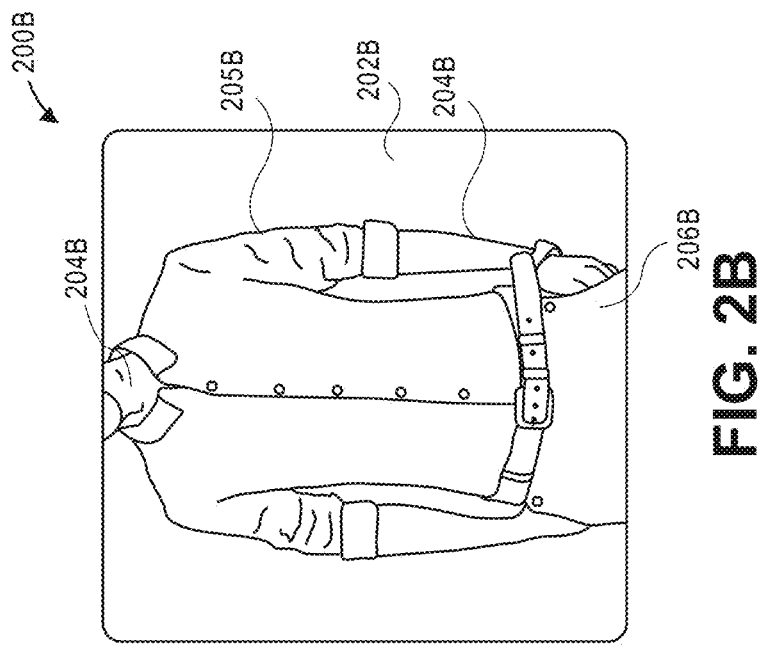
FIG. 2B is a schematic diagram of an example fifth image within which a principal color may be determined, according to an implementation.
Figure 2A:
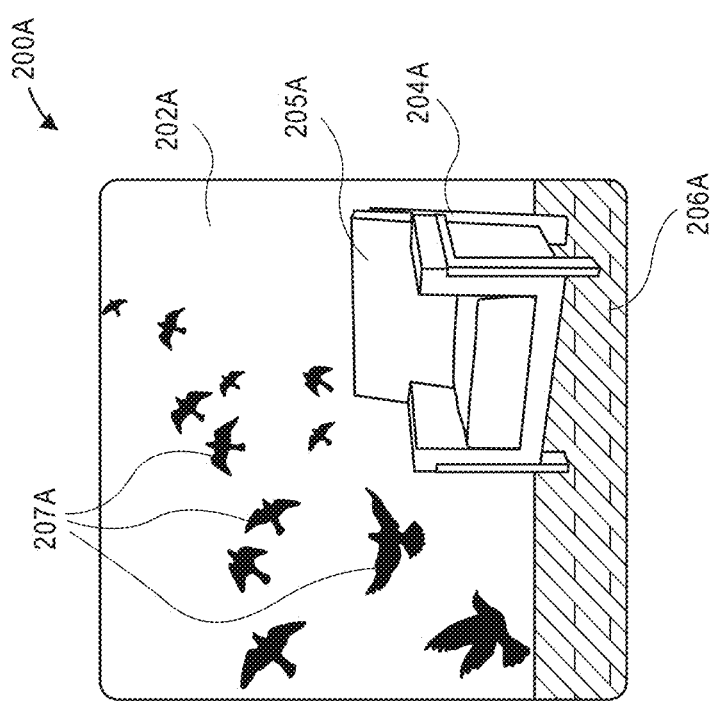
FIG. 2A is a schematic diagram of an example fourth image within which a principal color may be determined, according to an implementation.

FIG. 2A is a schematic diagram of an example fourth image 200A within which a principal color may be determined, according to an implementation.

The fourth image 200A may include a background 202A and one or more objects of interest, e.g., a fabric chair 205A having a wooden frame 204A. In addition to the chair 205A and frame 204A, the image 200A may also include background objects, e.g., bird designs 207A on the wall, and other objects, e.g., a floor 206A of the space. As shown in FIG. 2A, the chair 205A and frame 204A may be the primary object of interest within the image 200A, and in an example embodiment, the chair 205A may have a generally light brown color, the frame 204A may have a generally dark brown color, the bird designs 207A may have a generally black color, the floor 206A may have a generally dark brown color, and the background 202A may have a generally white color.

In order to determine a principal color associated with the image 200A, one or more object recognition algorithms may be used to identify one or more objects of interest within the image 200A. For example, an object recognition algorithm may identify the chair 205A, the bird designs 207A, and/or the floor 206A, and a principal color may be determined for each of the identified objects, e.g., based on a comparison of the numbers of pixels having different color values that are associated with each object. In addition, an object recognition algorithm may take into account additional information associated with the image 200A, e.g., a category, type, color, name, brand, size, or other information or metadata associated with an object represented in the image. For example, additional information associated with the image 200A may include a category of furniture, a type of chair, a color of light brown, or any other information. Based on this additional information, an object recognition algorithm may identify the chair 205A as the object of interest, and a principal color may be determined for the chair 205A. In other example embodiments, an object recognition algorithm may identify objects that are not associated with the additional information, such as category, type, name, brand, etc., associated with the image 200A, and may exclude color values of pixels associated with such other objects from the determination of a principal color.

In some example embodiments, the generally light brown color of the chair 205A may be determined to be the principal color of the image 200A, e.g., based on a comparison of the number of pixels associated with the identified object having color values that are generally light brown as compared to numbers of pixels having different color values. In addition, color values of pixels that are not associated with the identified object may be ignored. In other example embodiments, color values of pixels that are associated with identified objects that are not associated with the additional information related to the image may be ignored, and color values of all other pixels within the image 200A may be considered in the determination of a principal color. Further, color values of pixels that are generally white or off-white may not be considered as part of the determination of the principal color of image 200A, e.g., based on an assumption that such white or off-white color values are likely associated with a white background 202A.

FIG. 2B is a schematic diagram of an example fifth image 200B within which a principal color may be determined, according to an implementation.

The fifth image 200B may include a background 202B and one or more objects of interest, e.g., a shirt 205B worn by a person. In addition to the shirt 205B, the image 200B may also include human body objects 204B, such as arms, hands, neck, or face, and other objects, e.g., pants 206B worn by the person. As shown in FIG. 2B, the shirt 205B may be the primary object of interest within the image 200B, and in an example embodiment, the shirt 205B may have a generally red color, the pants 206B may have a generally dark blue color, the human body objects 204B may have any of various skin tones or colors (which colors may be different from or the same as colors of other objects within an image), and the background 202B may have a generally white color.

In order to determine a principal color associated with the image 200B, one or more object recognition algorithms may be used to identify one or more objects of interest within the image 200B. For example, an object recognition algorithm may identify the shirt 205B, the pants 206B, and/or the human body objects 204B, such as arms and neck, and a principal color may be determined for each of the identified objects, e.g., based on a comparison of the numbers of pixels having different color values that are associated with each object. In addition, an object recognition algorithm may take into account additional information associated with the image 200B, e.g., a category, type, color, name, brand, size, or other information or metadata associated with an object represented in the image. For example, additional information associated with the image 200B may include a category of fashion, a type of men's shirt, a color of red, or any other information. Based on this additional information, an object recognition algorithm may identify the shirt 205B as the object of interest, and a principal color may be determined for the shirt 205B. In other example embodiments, an object recognition algorithm may identify objects that are not associated with the additional information, such as category, type, name, brand, etc., associated with the image 200B, and may exclude color values of pixels associated with such other objects from the determination of a principal color.

In some example embodiments, the generally red color of the shirt 205B may be determined to be the principal color of the image 200B, e.g., based on a comparison of the number of pixels associated with the identified object having color values that are generally red as compared to numbers of pixels having different color values. In addition, color values of pixels that are not associated with the identified object may be ignored. In other example embodiments, color values of pixels that are associated with identified objects that are not associated with the additional information related to the image may be ignored, and color values of all other pixels within the image 200B may be considered in the determination of a principal color. Further, color values of pixels that are generally white, off-white, or any of various skin tones or colors may not be considered as part of the determination of the principal color of image 200B, e.g., based on an assumption that such white, off-white, or any of various skin tones or colors are likely associated with a white background 202B or human body objects 204B.

As is generally understood in the technical field of object detection and recognition, various types of object recognition algorithms, classifiers, or techniques may be used to detect and recognize one or more objects within an image. As described herein, various additional information or metadata associated with an image may be provided as inputs to the object recognition algorithms to aid, filter, or otherwise affect the identification of one or more objects by such algorithms. If the object recognition algorithms do not identify an object within an image and/or if no objects corresponding to the additional information or metadata associated with an image are identified, then the principal color of the image may be determined using other processes or techniques described herein without the use of object recognition techniques.

Responsive to identifying an object of interest within an image, e.g., the chair of FIG. 2A with or without the use of additional information such as a category of furniture, a type of chair, or other information or metadata, a location or position of the identified object within the image may be determined. For example, using various edge, surface, or feature detection algorithms and techniques, a subset of pixels associated with the identified object and their corresponding positions within the image may be determined. Alternatively or in addition, one or more boundaries of the identified object within the image may be estimated based on outermost positions of one or more pixels associated with the identified object, such that a square, rectangle, circle, other polygon, or other shape, may be positioned approximately around the subset of pixels associated with the identified object. In other example embodiments, an approximate center of the identified object within the image may be determined based on positions of pixels associated with the object, and a circle, oval, square, rectangle, other polygon, or other shape having a defined radius, length, width, or other dimensions, may be positioned around the approximate center of the subset of pixels associated with the identified object.

Responsive to identifying a location or position of the identified object within the image, color values of the subset of pixels associated with the identified object within the image may be determined to identify a principal color of the object, as further described herein. In various example embodiments, the subset of pixels for which color values are evaluated may include pixels determined to be associated with the identified object, pixels that are within a defined boundary around the identified object, pixels that are within a defined radius or distance from a center of the identified object, or other subsets of pixels that are determined to be associated with the identified object.

Figure 3B:
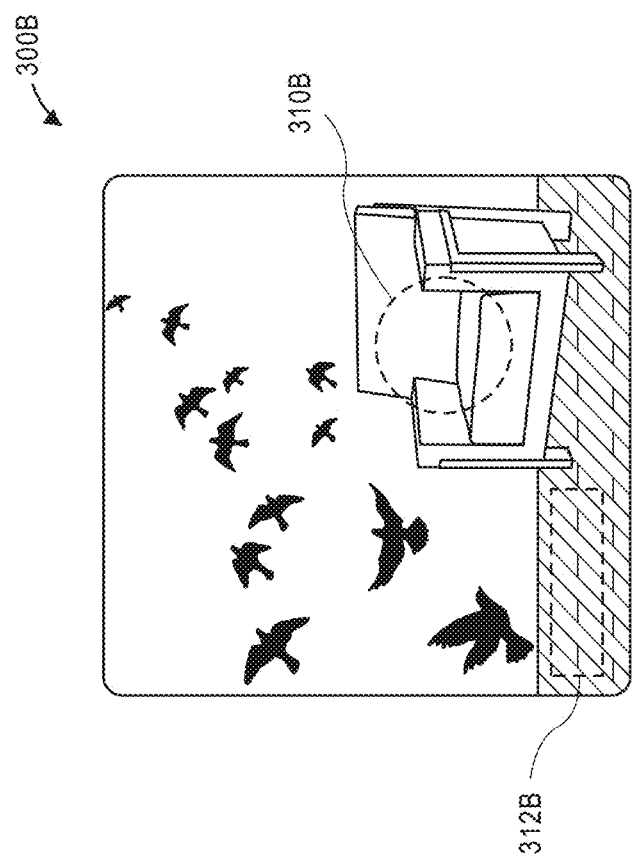
FIG. 3B is a schematic diagram of an example seventh image within which a principal color may be determined, according to an implementation.
Figure 3A:
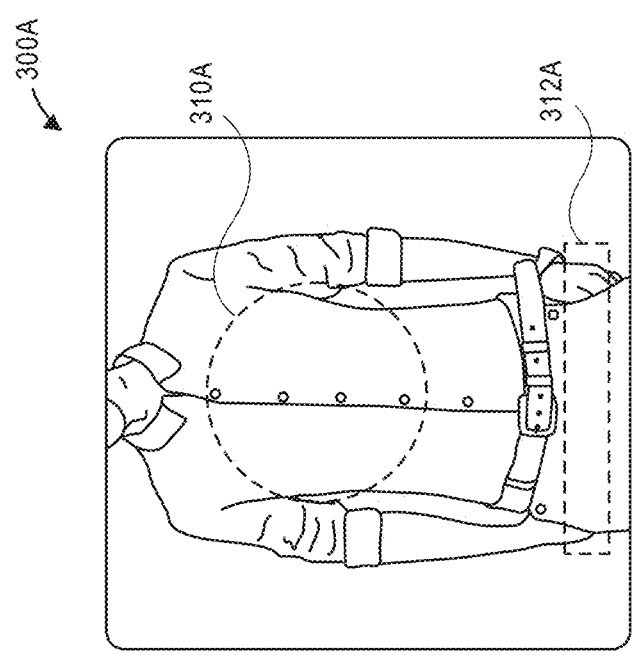
FIG. 3A is a schematic diagram of an example sixth image within which a principal color may be determined, according to an implementation.

FIG. 3A is a schematic diagram of an example sixth image 300A within which a principal color may be determined, according to an implementation.

The sixth image 300A may include a background and one or more objects of interest, e.g., a shirt worn by a person. In addition to the shirt, the image 300A may also include human body objects, such as arms, hands, neck, or face, and other objects, e.g., pants worn by the person. As shown in FIG. 3A, the shirt may be the primary object of interest within the image 300A, and in an example embodiment, the shirt may have a generally red color, the pants may have a generally dark blue color, the human body objects may have any of various skin tones or colors (which colors may be different from or the same as colors of other objects within an image), and the background may have a generally white color.

In order to determine a principal color associated with the image 300A, color values of pixels within one or more subregions of the image 300A may be determined. For example, a first subregion 310A having a generally circular shape may be generally centered within the image 300A, e.g., based on an assumption that an object of interest will generally be centered within the image 300A. In addition, a second subregion 312A having a generally rectangular shape may be located at a lower edge of the image 300A, e.g., based on an expected location of text elements, user interface elements, or other elements to be added to or superimposed over the image 300A within the second subregion 312A. In other embodiments, the subregions may have other shapes and sizes, and may be located at other positions within the image.

In some example embodiments, the generally red color of the shirt may be determined to be the principal color of the first subregion 310A of the image 300A, e.g., based on a comparison of the number of pixels within the first subregion 310A having color values that are generally red as compared to numbers of pixels within the first subregion 310A having different color values. In other example embodiments, color values of pixels that are generally white, off-white, or any of various skin tones or colors may not be considered as part of the determination of the principal color of image 300A, e.g., based on an assumption that such white, off-white, or any of various skin tones or colors are likely associated with a white background or human body objects.

Further, the generally dark blue color of the pants may be determined to be the principal color of the second subregion 312A of the image 300A, e.g., based on a comparison of the number of pixels within the second subregion 312A having color values that are generally dark blue as compared to numbers of pixels within the second subregion 312A having different color values. In other example embodiments, color values of pixels that are generally white, off-white, or any of various skin tones or colors may not be considered as part of the determination of the principal color of image 300A, e.g., based on an assumption that such white, off-white, or any of various skin tones or colors are likely associated with a white background or human body objects. The determination of the principal color of the second subregion 312A, within which text elements, user interface elements, or other elements may be added to or superimposed over the image 300A, may be used to identify colors associated with such elements, e.g., complement colors as described herein, in order to increase or improve visibility and/or readability of such elements, while also accentuating an object of interest within the image 300A.

FIG. 3B is a schematic diagram of an example seventh image 300B within which a principal color may be determined, according to an implementation.

The seventh image 300B may include a background and one or more objects of interest, e.g., a fabric chair having a wooden frame. In addition to the chair, the image 300B may also include background objects, e.g., bird designs on the wall, and other objects, e.g., a floor of the space. As shown in FIG. 3B, the chair may be the primary object of interest within the image 300B, and in an example embodiment, the chair may have a generally light brown color, the wooden frame may have a generally dark brown color, the bird designs may have a generally black color, the floor may have a generally dark brown color, and the background may have a generally white color. In some example embodiments, the one or more objects of interest may be determined based at least in part on various factors associated with a user's session, e.g., search queries, search terms, keywords, user selections or inputs, category or type preferences, brand preferences, applied or selected filters, browsing history, purchase history, cursor location, cursor dwell time, and/or other factors.

In order to determine a principal color associated with the image 300B, color values of pixels within one or more subregions of the image 300B may be determined. For example, a first subregion 310B having a generally circular shape may be generally centered on the chair within the image 300B, e.g., using object recognition algorithms as described herein to identify the chair and then centering the first subregion 310B within the identified object of the image 300B. In addition, a second subregion 312B having a generally rectangular shape may be located at a lower edge or corner of the image 300B, e.g., based on an expected location of text elements, user interface elements, or other elements to be added to or superimposed over the image 300B within the second subregion 312B while also avoiding placement of such elements over portions of the identified object within the image 300B. In other embodiments, the subregions may have other shapes and sizes, and may be located at other positions within the image, with or without the use of object recognition algorithms to inform their shapes, sizes, and/or positions.

In some example embodiments, the generally light brown color of the chair may be determined to be the principal color of the first subregion 310B of the image 300B, e.g., based on a comparison of the number of pixels within the first subregion 310B having color values that are generally light brown as compared to numbers of pixels within the first subregion 310B having different color values. In other example embodiments, color values of pixels that are generally white, off-white, or any of various skin tones or colors may not be considered as part of the determination of the principal color of image 300B, e.g., based on an assumption that such white, off-white, or any of various skin tones or colors are likely associated with a white background or human body objects.

Further, the generally dark brown color of the floor may be determined to be the principal color of the second subregion 312B of the image 300B, e.g., based on a comparison of the number of pixels within the second subregion 312B having color values that are generally dark brown as compared to numbers of pixels within the second subregion 312B having different color values. In other example embodiments, color values of pixels that are generally white, off-white, or any of various skin tones or colors may not be considered as part of the determination of the principal color of image 300B, e.g., based on an assumption that such white, off-white, or any of various skin tones or colors are likely associated with a white background or human body objects. The determination of the principal color of the second subregion 312B, within which text elements, user interface elements, or other elements may be added to or superimposed over the image 300B, may be used to identify colors associated with such elements, e.g., complement colors as described herein, in order to increase or improve visibility and/or readability of such elements, while also accentuating an object of interest within the image 300B.

Figure 4B:
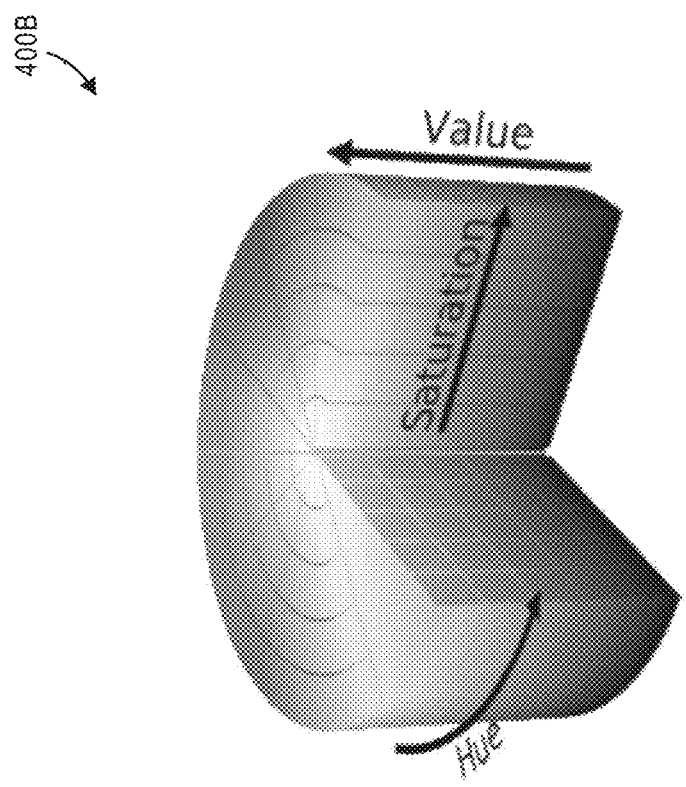
FIG. 4B is another schematic diagram of an example color wheel, according to an implementation.
Figure 4A:
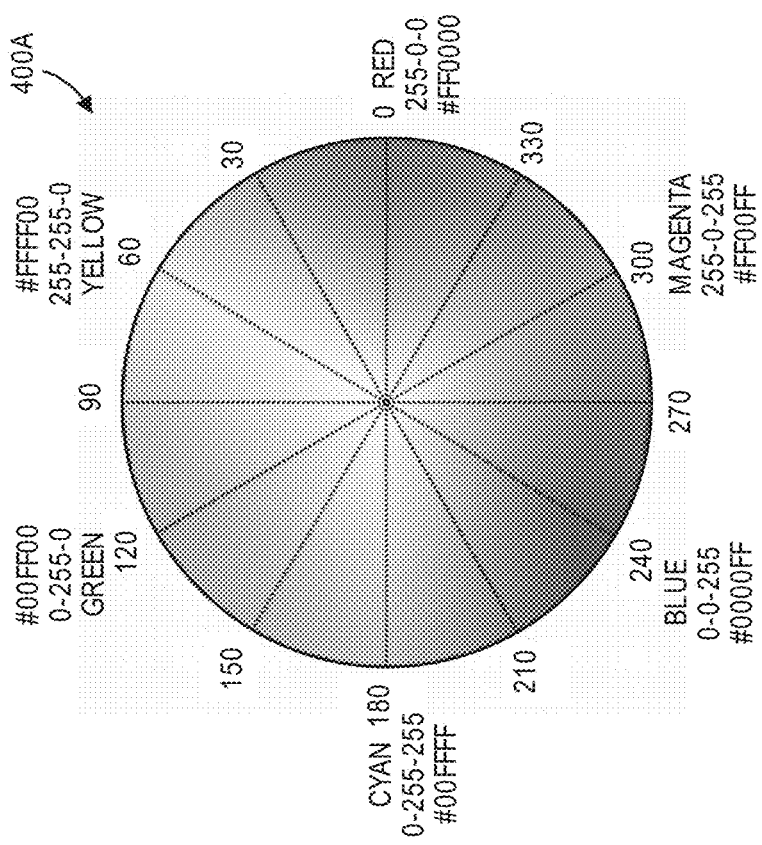
FIG. 4A is a schematic diagram of an example color wheel, according to an implementation.

FIG. 4A is a schematic diagram of an example color wheel 400A, according to an implementation.

Colors that may be displayed via display devices connected to one or more computing devices may be defined using various color models. The various color models may include, without limitation, the HSL (hue-saturation-lightness) color model, the HSV (hue-saturation-value) color model, the HCL (hue-chroma-luminance) color model, the RGB (red-green-blue) color model, the CMYK (cyan-magenta-yellow-black) color model, the hexadecimal color model, the NCS (Natural Color System) color model, and various other color models, spaces, or systems.

FIG. 4A illustrates a top-down, two-dimensional view of an example HSL (or HSV) color wheel. The hue (H) of a particular color may generally be defined based on a dominant wavelength of light associated with the particular color. For example, the dominant wavelengths for red are between approximately 700 nm and 635 nm, the dominant wavelengths for orange are between approximately 635 nm and 590 nm, the dominant wavelengths for yellow are between approximately 590 nm and 560 nm, the dominant wavelengths for green are between approximately 560 nm and 520 nm, the dominant wavelengths for cyan are between approximately 520 nm and 490 nm, the dominant wavelengths for blue are between approximately 490 nm and 450 nm, and the dominant wavelengths for violet are between approximately 450 nm and 400 nm. In addition, as shown in FIG. 4A, hue may be represented as an angular coordinate around the color wheel. For example, red may be represented at 0 (or 360) degrees, yellow may be represented at 60 degrees, green may be represented at 120 degrees, cyan may be represented at 180 degrees, blue may be represented at 240 degrees, magenta may be represented at 300 degrees, and various mixtures of different hues may be represented at various angular coordinates other than those described here.

In addition, as shown in FIG. 4A, the various hues represented in degrees in the example HSL (or HSV) color wheel may be approximately equivalent to representations of colors in other color models, spaces, or systems. For example, red at 0 (or 360 degrees) in HSL or HSV color models may be approximately equivalent to red having values 255-0-0 in an RGB color model and to red having values #FF0000 in a hexadecimal color model. Likewise, green at 120 degrees in HSL or HSV color models may be approximately equivalent to green having values 0-255-0 in an RGB color model and to green having values #00FF00 in a hexadecimal color model. In addition, blue at 240 degrees in HSL or HSV color models may be approximately equivalent to blue having values 0-0-255 in an RGB color model and to blue having values #0000FF in a hexadecimal color model.

FIG. 4B is another schematic diagram of an example color wheel 400B, according to an implementation.

FIG. 4B illustrates a perspective, cutaway, three-dimensional view of an example HSL (or HSV) color wheel or cylinder. As described herein, the hue (H) of a particular color may generally be defined based on a dominant wavelength of light associated with the particular color. As shown in FIG. 4B, hue may be represented as an angular coordinate around the color wheel. In addition, the saturation (S) of a particular color may generally be defined based on a colorfulness relative to a brightness associated with the particular color. As shown in FIG. 4B, saturation may be represented along a radial coordinate of the color wheel with values ranging from 0 (least saturated, concentrated, or colorful) to 1 (most saturated, concentrated, or colorful). Further, the lightness (L) or value (V) of a particular color may generally be defined based on a brightness, or amount of black or white, associated with the particular color. As shown in FIG. 4B, lightness or value may be represented along a vertical or axial coordinate of the color wheel with values ranging from 0 (least lightness or value) to 1 (most lightness or value).

When determining a principal color associated with an image as described herein, any one or more of the aspects or values associated with colors described herein, including hue, saturation, lightness or value, or any other aspects or values included as part of the definitions of colors in the various color models, spaces, or systems may be used to identify the principal color. In some example embodiments, a principal color may be determined based on a color value or range of color values, e.g., a hue or range/band of similar hues, associated with the greatest number of pixels within an image, or a portion or subregion of an image. In other example embodiments, a principal color may be determined based on a combination of two or more aspects or values associated with colors, such as a combination of two or more of hue, saturation, and/or lightness or value. Any other combinations of aspects or values associated with colors may also be used to determine a principal color associated with an image, or a portion or subregion of an image.

Figure 5A:
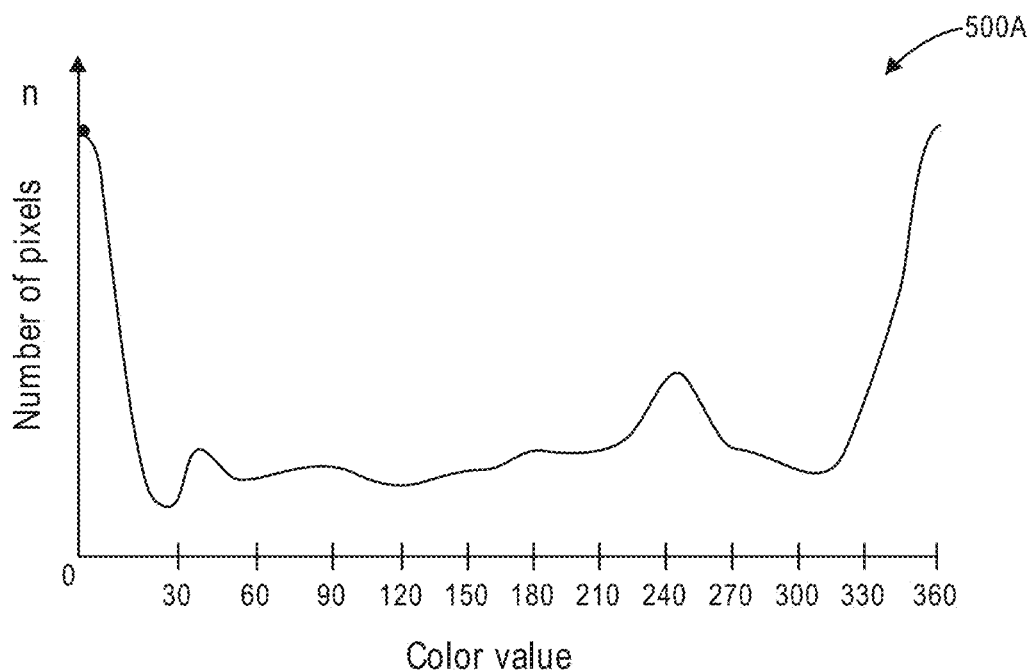
FIG. 5A is a schematic histogram of example color values and pixels from which a principal color may be determined, according to an implementation.

FIG. 5A is a schematic histogram 500A of example color values and pixels from which a principal color may be determined, according to an implementation. The schematic histogram includes hues from 0 to 360 degrees as represented in an HSL or HSV color wheel on the x-axis, and a number of pixels from 0 to n on the y-axis.

For example, FIG. 5A may be schematic histogram of color values, e.g., hues or ranges/bands of hues, associated with the image 100A shown in FIG. 1A. As a result, the histogram shows a large number of pixels associated with hues in the red band, e.g., between approximately 330 and 30 degrees, a smaller number of pixels associated with hues in the dark blue band, e.g., between approximately 210 and 270 degrees, and a small number of pixels associated with hues in the yellow band, e.g., between approximately 30 and 60 degrees. In this example, the large number of pixels in the red band may be associated with the pixels that represent the shirt 105A in FIG. 1A, the smaller number of pixels in the dark blue band may be associated with the pixels that represent the pants 106A in FIG. 1A, and the small number of pixels in the yellow band may be associated with the pixels that represent the human body objects 104A in FIG. 1A. Based on the large number of pixels in the red band as shown in the schematic histogram of FIG. 5A, the generally red color of the shirt 105A may be determined to be the principal color of the image 100A in FIG. 1A.

Figure 5B:
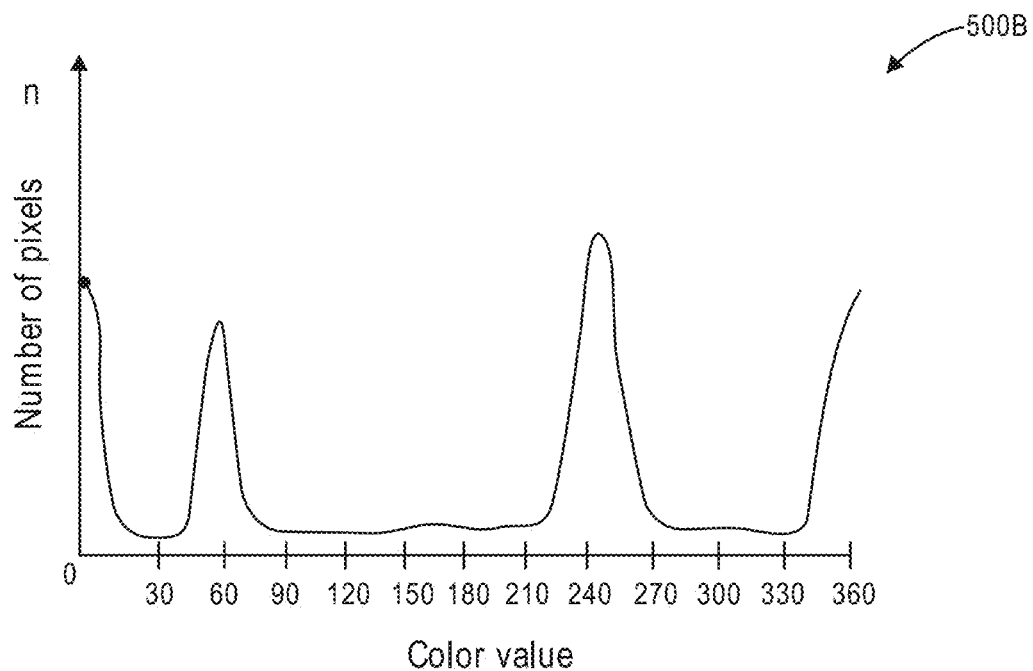
FIG. 5B is another schematic histogram of example color values and pixels from which a principal color may be determined, according to an implementation.

FIG. 5B is another schematic histogram 500B of example color values and pixels from which a principal color may be determined, according to an implementation. The schematic histogram includes hues from 0 to 360 degrees as represented in an HSL or HSV color wheel on the x-axis, and a number of pixels from 0 to n on the y-axis.

For example, FIG. 5B may be schematic histogram of color values, e.g., hues or ranges/bands of hues, associated with the image 100B shown in FIG. 1B. As a result, the histogram shows a large number of pixels associated with hues in the blue band, e.g., between approximately 210 and 270 degrees, a medium number of pixels associated with hues in the red band, e.g., between approximately 330 and 30 degrees, and a smaller number of pixels associated with hues in the yellow band, e.g., between approximately 30 and 90 degrees. In this example, the large number of pixels in the blue band may be associated with the pixels that represent the blue straws 105B-1 in FIG. 1B, the medium number of pixels in the red band may be associated with the pixels that represent the red straws 105B-3 in FIG. 1B, and the smaller number of pixels in the yellow band may be associated with the pixels that represent the yellow straws 105B-2 in FIG. 1B. Based on the large number of pixels in the blue band as shown in the schematic histogram of FIG. 5B, the generally blue color of the blue straws 105B-1 may be determined to be the principal color of the image 100B in FIG. 1B. In other example embodiments, because the numbers of pixels associated with each of the differently colored straws 105B-1, 105B-2, 105B-3 in FIG. 1B are relatively close, one of the colors may be chosen, e.g., at random, based on additional information or metadata associated with the image, based on user preferences, characteristics, or inputs, and/or based on additional information or color values of other images displayed simultaneously and/or side-by-side with the image, as the principal color of the image 100B. In still further example embodiments, because the numbers of pixels associated with each of the differently colored straws 105B-1, 105B-2, 105B-3 in FIG. 1B are relatively close, two or more of the colors may be chosen as the principal colors of the image 100B.

Figure 5C:
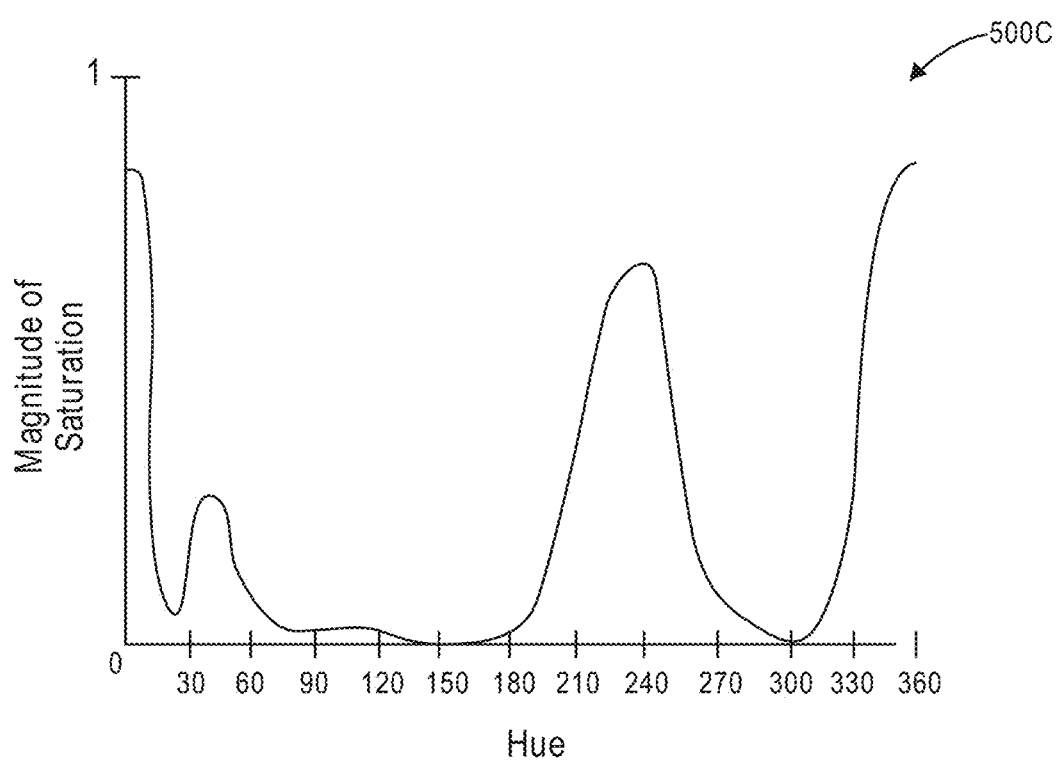
FIG. 5C is a schematic histogram of example hue and saturation values from which a principal color may be determined, according to an implementation.

FIG. 5C is a schematic histogram 500C of example hue and saturation values from which a principal color may be determined, according to an implementation. The schematic histogram includes hues from 0 to 360 degrees as represented in an HSL or HSV color wheel on the x-axis, and magnitude of saturation from 0 to 1 on the y-axis. For example, in some example embodiments, the magnitude of saturation on the y-axis may comprise a summation of saturation values associated with particular hues within an image.

For example, FIG. 5C may be schematic histogram of hue and saturation values associated with the image 100A shown in FIG. 1A. As a result, the histogram shows a large number of pixels associated with hues in the red band, e.g., between approximately 330 and 30 degrees, and having a relatively high magnitude of saturation, a medium number of pixels associated with hues in the dark blue band, e.g., between approximately 210 and 270 degrees, and having a medium magnitude of saturation, and a small number of pixels associated with hues in the yellow band, e.g., between approximately 30 and 60 degrees, and having a low magnitude of saturation. In this example, the large number of pixels in the red band having a relatively high magnitude of saturation may be associated with the pixels that represent the shirt 105A in FIG. 1A, the medium number of pixels in the dark blue band having a medium magnitude of saturation may be associated with the pixels that represent the pants 106A in FIG. 1A, and the small number of pixels in the yellow band having a low magnitude of saturation may be associated with the pixels that represent the human body objects 104A in FIG. 1A. Based on the large number of pixels in the red band having a relatively high magnitude of saturation as shown in the schematic histogram of FIG. 5C, the generally red color of the shirt 105A may be determined to be the principal color of the image 100A in FIG. 1A.

In other example embodiments, other color values or aspects, or combinations thereof, may be evaluated to determine a principal color. For example, instead of or in addition to magnitude levels, which may correspond to summations of particular color values or aspects, other characteristics or properties, such as mean, median, mode, variance, and/or other properties of one or more color values or aspects, may be used to determine a principal color. In addition, one or more threshold values related to a number of pixels and/or one or more color values may be included to aid in the determination of the principal color. As one example, a minimum threshold value related to a number of pixels having a particular hue may be included in the determination of a principal color to avoid selecting a principal color that is associated with only a very small number of pixels that have highly saturated color values. Further, heatmaps of various color values or aspects and other analytical tools may also be used, alternatively or in addition to histograms as described herein, to determine a principal color.

In addition to the accentuation of images with complement colors based on determined principal colors within an image as further described herein, the determined principal colors may also be used for other applications. For example, if a user searches or filters images based on a color selection, images matching the search or filter criteria may be analyzed to determine one or more principal colors within the image, in order to provide only those images that include the color selection as one of the principal colors within the images. In this manner, erroneous search or filter results, e.g., if an image is erroneously categorized as including a red shoe even though the image actually includes a blue shoe, may not be provided to a user who searched for red shoes, thereby improving the user's experience.

In example embodiments, various images of a single product with multiple color options, e.g., shirts, pants, shoes, or other clothing with multiple color options for a single design, may generally be tagged or categorized by a provider of the images or products with their respective colors. However, in the event that such tags or categorizations are incorrectly associated, e.g., a blue shirt is tagged as a black shirt, the systems and processes described herein related to determining principal colors within an image may be used to determine the principal color of the image, e.g., blue for the blue shirt, and correctly provide images of a product when a user searches or filters based on color, e.g., providing an image of the blue shirt responsive to a filter criterion for the color blue. Moreover, such systems and processes may be used to provide feedback to a provider of the images or products and correct erroneous tags or categorizations, thereby improving data integrity and also user experiences with such user interfaces and images of items or products provided via such user interfaces.

In other example applications, a metric related to image color quality may be defined based on one or more aspects of color values of pixels within an image. Images may be analyzed to determine one or more principal colors within the images, and the principal colors may then be compared to the metric of image color quality to make a determination as to the overall quality of the images. The metric related to image color quality may be based on any individual aspect of color values or on any combination of the various aspects of color values, according to one or a combination of various color models.

For example, the metric of image color quality may be related to levels of contrast within an image, which may be related to values of saturation and/or lightness in the context of the HSL or HSV color model. In addition, the metric of image color quality may be related to levels of color concentration within an image, which may be related to values of saturation and/or narrowness of bands of hues in the context of the HSL or HSV color model. Further, the metric of image color quality may be related to levels of brightness within an image, which may be related to values of lightness and/or value in the context of the HSL or HSV color model. In other example embodiments, the metric of image color quality may be defined based on any other aspects or values of colors described herein for any of the various color models, spaces, or systems, and any combinations thereof. By using the systems and processes described herein related to determining principal colors within an image, images of poor color quality, e.g., dull images, washed-out images, grainy images, unfocused images, or other images that may poorly represent an object of interest, may be avoided, deprecated, removed, and/or disfavored for display to users. Moreover, such systems and processes may be used to provide feedback to a provider of the images or products in order to correct or improve color quality of provided images, thereby improving data integrity and also user experiences with such user interfaces and images of items or products provided via such user interfaces.

Upon determining a principal color associated with an image or a portion or subregion of an image, a complement color may then be identified based at least in part on the determined principal color. In some example embodiments, a complement color may be defined as the opposite of the determined principal color. For example, in HSL or HSV color models, a complement color may be defined as a color that is 180 degrees away from the determined principal color. Thus, as shown in FIG. 4A, if the principal color is red at 0 degrees, then the complement color may be defined as cyan at 180 degrees. Likewise, if the principal color is blue at 240 degrees, then the complement color may be defined as yellow at 60 degrees. In other example embodiments, a complement color may be defined as any other color on a color wheel relative to the determined principal color, e.g., the complement color may be 60 degrees counterclockwise from the determined principal color, the complement color may be 120 degrees counterclockwise from the determined principal color, the complement color may be 60 degrees clockwise from the determined principal color, the complement color may be 120 degrees clockwise from the determined principal color, or any other defined relationship between the complement color and the determined principal color.

In addition, a complement color may have a saturation level and/or a lightness or value level that is defined relative to the determined principal color. For example, the saturation level of the complement color may be determined based at least in part on the saturation level of the determined principal color, and/or the lightness or value level of the complement color may also be determined based at least in part on the lightness or value level of the determined principal color. Alternatively, a complement color may have a defined saturation level or range and/or a defined lightness or value level or range. For example, a complement color defined according to an HSL color model may have a defined saturation level of approximately 0.5 on a scale of 0 to 1, or any other saturation level between approximately 0.4 and approximately 0.6 on a scale of 0 to 1, and may have a defined lightness level of approximately 0.9 or higher on a scale of 0 to 1, or any other lightness level higher than approximately 0.5 on a scale of 0 to 1. In addition, a complement color defined according to an HSV color model may have a defined saturation level of approximately 0.1 or lower on a scale of 0 to 1, or any other saturation level lower than approximately 0.5 on a scale of 0 to 1, and may have a defined value level of approximately 0.9 or higher on a scale of 0 to 1, or any other value level higher than approximately 0.5 on a scale of 0 to 1.

In still further example embodiments, a complement color may be defined using any one or more aspects or values associated with colors in various other color models, spaces, or systems relative to the determined principal color.

FIG. 6 is a schematic table 600 of example complement colors associated with principal colors, according to an implementation.

In some example embodiments, complement colors may be defined in one or more tables or databases based at least in part on the one or more principal colors. For example, the one or more tables or databases may define one complement color for each principal color, e.g., in a one-to-one relationship. In addition, the one or more tables or databases may define one complement color for multiple principal colors or multiple complement colors for each principal color, e.g., in a one-to-many relationship. Further, any of the various aspects or values associated with colors may be defined as part of the complement colors associated with principal colors within the one or more tables or databases. By defining relationships between one or more complement colors and one or more principal colors, images may be more uniformly altered, adjusted, or modified for presentation to a user as compared to using any and all possible complement colors in combination with determined principal colors.

As shown in FIG. 6, the schematic table 600 may include a set of principal colors 605. The schematic table defines the principal colors with reference to hues of an HSV or HSL color model. However, the principal colors may be defined based on any other aspects or values associated with colors in various color models, spaces, or systems. Referring again to FIG. 6, since an image may be determined to have a principal color that does not exactly coincide with one of the defined principal colors in the schematic table 600, a closest match between the determined principal color of the image and one of the defined principal colors in the table 600 may be determined. In the example table 600 of FIG. 6, if a determined principal color of an image includes a hue value of 25, the closest match with one of the defined principal colors in the table 600 may be determined to be a hue value of 30.

The schematic table 600 may also include a first set of complement colors 615A. The schematic table defines the complement colors with reference to hue-saturation-value levels of an HSV color model. However, the complement colors may be defined based on any other aspects or values associated with colors in various color models, spaces, or systems. Referring again to FIG. 6, if the closest match with one of the defined principal colors in the table 600 is determined to be a hue value of 30, then the corresponding complement color may be identified as having hue-saturation-value levels of 210, 0.1, 0.9.

Alternatively or in addition, a plurality of sets of complement colors 615 may be defined in the same or different tables or databases associated with the same or different sets of principal colors. For example, the schematic table 600 may also include a second set of complement colors 615B, a third set of complement colors 615C, and additional sets of complement colors. The second set of complement colors 615B may be associated with a category of fashion items, as an example, and the third set of complement colors 615C may be associated with a category of children's items. Additional sets of complement colors may be associated with other categories, types, colors, names, brands, sizes, or other information or metadata associated with images. As shown in FIG. 6, the second set of complement colors 615B may define a particular set of colors, e.g., generally neutral colors, that may be used for images associated with a category of fashion items. Likewise, the third set of complement colors 615C may define a particular set of colors, e.g., generally primary colors, that may be used for images associated with a category of children's items. Similarly, other sets of complement colors may define particular sets of colors that may be used for images associated with other categories, types, colors, names, brands, sizes, etc. In this manner, visual and/or color themes may be maintained for particular categories, types, colors, names, brands, sizes, etc. that may attract and/or maintain the attention of a viewer.

In addition to categories, types, colors, names, brands, sizes, etc. associated with images, complement colors may also be selected based at least in part on user preferences, user inputs, user characteristics such as color blindness or sensitivity, geographic or regional preferences or characteristics, computing device and/or display device characteristics or capabilities, or other user, computing device, and/or display device characteristics. For example, a user may indicate a preference for generally neutral colors, generally primary colors, generally cool colors, generally warm colors, or any other preferences. Such user preferences may be explicitly requested from a user and/or provided by the user. Alternatively, such user preferences may be inferred or determined based on user activity, e.g., search history, browse history, purchase history, view history, or other interactions with images displayed via a computing device and/or a display device. In addition, some user activities, e.g., purchase history or view history, may be used as feedback to the selection of complement colors to favor or apply greater weights to such complement colors that may tend to lead to greater numbers of purchases or views. Moreover, user preferences may be inferred based on preferences and/or activities of other users who may be determined to have similar characteristics to a user. In addition, if a user provides an input to search or filter based on a color selection, a single complement color may be selected and applied to all provided or filtered search results as a visual confirmation to the user that all results have been provided based on the color selection by the user. Further, particular complement colors may be preferred or disfavored based on color blindness or sensitivity characteristics associated with users.

Moreover, various types of computing devices and/or display devices may have different characteristics or capabilities, e.g., color display characteristics. For example, some devices may be able to display particular hues with greater saturation levels than other hues. In addition, some devices may be able to display brighter whites or lighter colors while other devices may be able to display deeper blacks or darker colors. Further, some devices such as virtual reality devices or headsets may have difficulty displaying transitions between dark and light colors, such that the transitions may be relatively slow and may also be accompanied by flickering, shimmering, sparkling, or other unwanted visual effects during the transitions. These and other characteristics or capabilities of various computing devices and/or display devices may be taken into account when identifying complement colors based at least in part on determined principal colors, e.g., selecting complement colors having maximum contrast while minimizing flickering, shimmering, sparkling, or other unwanted visual effects associated with characteristics or capabilities of various computing devices and/or display devices.

Upon identifying a complement color based at least in part on a determined principal color of an image, the complement color may be applied to at least a portion of the image. In some example embodiments, the complement color may be applied as one or more tiles over one or more portions of the image. In other example embodiments, color values of one or more pixels of the image may be altered or modified based at least in part on the identified complement color.

Figure 7B:
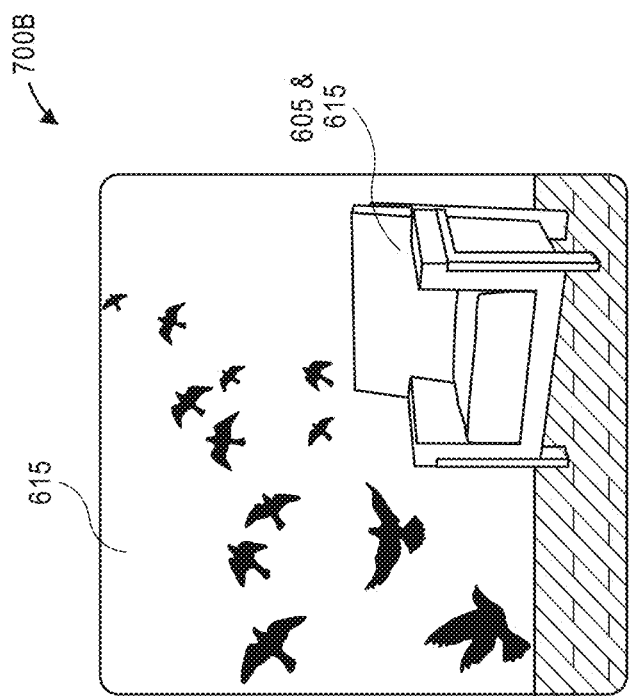
FIG. 7B is a schematic diagram of an example ninth image modified with a complement color associated with a principal color, according to an implementation.
Figure 7A:
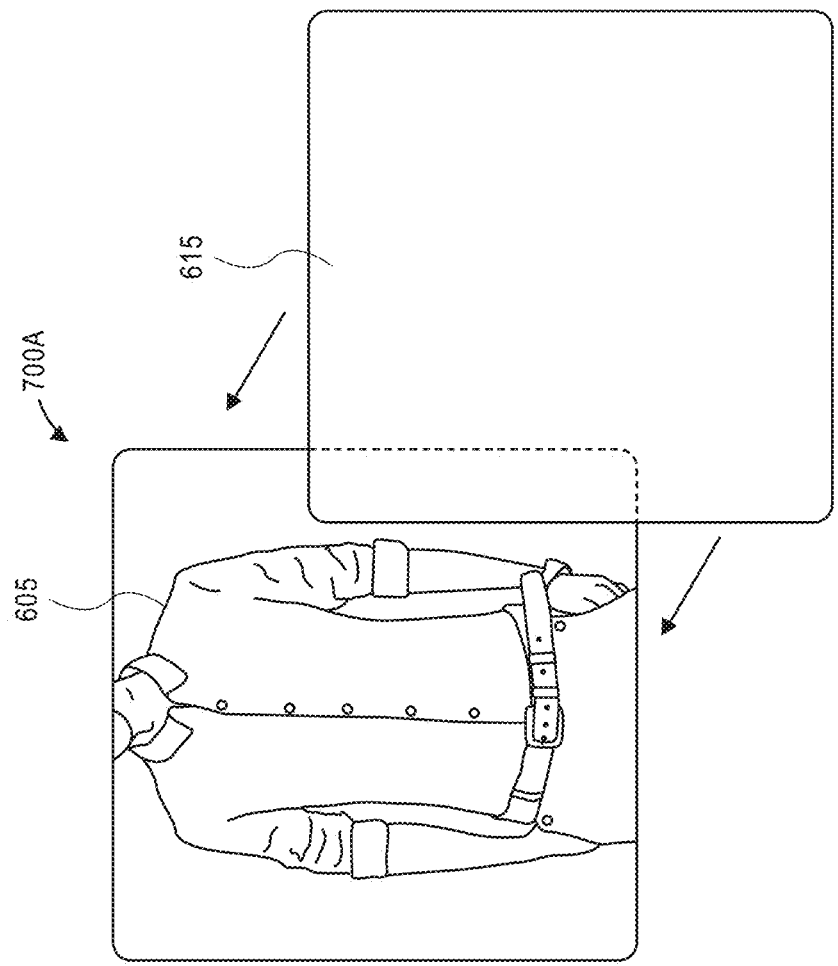
FIG. 7A is a schematic diagram of an example eighth image overlaid with a complement color associated with a principal color, according to an implementation.

FIG. 7A is a schematic diagram of an example eighth image 700A overlaid with a complement color associated with a principal color, according to an implementation.

The eighth image 700A may include an object of interest, e.g., a shirt worn by a person, and other objects, such as human body objects, other articles of clothing, and a background. As described herein, a principal color 605 may be determined for the image. For example, the principal color 605 may be a substantially red color of the shirt in the image 700A. If a table or database similar to that shown in FIG. 6 including associations between principal colors and complement colors is used, the principal color 605 may be determined to be closest to a red color represented at 0 degrees in an HSL or HSV color model, and the complement color 615 may be identified as having hue-saturation-value levels of 150, 0.05, 0.95 from the second set of complement colors 615B associated with a category of fashion items.

The identified complement color 615 may be applied to a tile, and the tile may be overlaid onto the image, as schematically illustrated in FIG. 7A. Although FIG. 7A shows a tile having a size substantially the same as the image, in other example embodiments, the identified complement color 615 may be applied to tiles of different sizes and shapes that may be overlaid onto one or more portions or subregions of the image. For example, if principal colors for one or more subregions of the image were determined, then respective complement colors may be applied to each of the one or more subregions of the image. In addition, if object recognition algorithms were used to identify an object of interest within the image for which a principal color was determined, then a complement color may be applied to portions of the image other than the recognized object of interest. Further, if a principal color is determined for a subregion within which one or more text elements, user interface elements, or other elements are to be added or superimposed, then a complement color may be applied to the subregion of the image in order to accentuate the one or more text elements, user interface elements, or other elements.

FIG. 7B is a schematic diagram of an example ninth image 700B modified with a complement color associated with a principal color, according to an implementation.

The ninth image 700B may include an object of interest, e.g., a fabric chair having a wooden frame, and other objects, such as bird designs on a wall, a floor of the space, and a background. As described herein, a principal color 605 may be determined for the image. For example, the principal color 605 may be a substantially light brown color of the chair in the image 700B. If a table or database similar to that shown in FIG. 6 including associations between principal colors and complement colors is used, the principal color 605 may be determined to be closest to a yellow color represented at 60 degrees in an HSL or HSV color model, and the complement color 615 may be identified as having hue-saturation-value levels of 240, 0.05, 0.95 from a further set of complement colors 615 associated with a category of furniture items.

The color values of pixels within the image may then be modified to incorporate the color values of the identified complement color 615. For example, if the color values of pixels within the image are defined according to the RGB color model as having values between 0-0-0 and 255-255-255, then the identified complement color 615 having hue-saturation-value levels of 240, 0.05, 0.95 may be substantially equivalent to RGB color values of 230-230-242. The RGB color values of 230-230-242 of the complement color 615 may then be subtracted from RGB color values of white, i.e., 255-255-255, which in this example results in difference RGB color values of 25-25-13. Then, the difference RGB color values of 25-25-13 may be subtracted from the RGB color values of pixels within the image to be adjusted or modified. In this manner, white pixels within the image, e.g., having RGB color values of 255-255-255, may be modified to have RGB color values of 230-230-242 upon subtraction of the difference RGB color values from white RGB color values. Other pixels within the image may also be modified to have slightly darker color values upon the subtraction of the difference RGB color values from their respective RGB color values. As a result, the adjustment or modification to white or lighter color pixels may be more noticeable, whereas the adjustment or modification to black or darker color pixels may be effectively imperceptible or negligible.

In some example embodiments, color values of all pixels within an image may be modified to incorporate color values of the identified complement color 615. In other example embodiments, if principal colors for one or more subregions of the image were determined, then color values of pixels in one or more subregions of the image may be modified to incorporate color values of respective identified complement colors 615 for each of the one or more subregions. In addition, if object recognition algorithms were used to identify an object of interest within the image for which a principal color was determined, then color values of pixels other than pixels associated with the recognized object of interest may be modified to incorporate color values of the identified complement color 615. Further, if a principal color is determined for a subregion within which one or more text elements, user interface elements, or other elements are to be added or superimposed, then color values of the one or more text elements, user interface elements, or other elements within the subregion may be modified to incorporate color values of the identified complement color 615. In still further example embodiments, only pixels within an image that are white, off-white, or having color values, e.g., RGB color values, above a certain threshold color value may be modified to incorporate color values of the identified complement color 615.

In still further example embodiments, alternatively or in addition to applying a complement color to a portion of an image, one or more textures or patterns may be applied to a portion of an image. The one or more textures or patterns may also include the determined complement color, e.g., a cross-hatched pattern or other pattern formed with the complement color. For example, a texture or pattern may be applied to an entire image, to one or more portions or subregions of an image, and/or based on objects identified within an image. If one or more objects have been detected and recognized within an image, a texture or pattern may be applied to one or more identified objects, to portions of the image other than any identified objects, to only a background of the image, or other combinations thereof.

Upon applying the identified complement color(s) to one or more pixels, portions, or subregions of an image based at least in part on the determined principal color(s), the image and one or more objects represented within the image may be accentuated, such that the one or more objects may be more visually appealing and differentiated from other objects within the image, as well as from other images which may be displayed simultaneously and/or adjacent to the image. Further, text elements, user interface elements, or other elements within one or more portions or subregions of an image may also be accentuated such that they are more easily visible to a viewer. The application of complement colors to images based at least in part on determined principal colors within the images may also provide a user interface having a plurality of images with a more unified and cohesive overall appearance.

Figure 8:
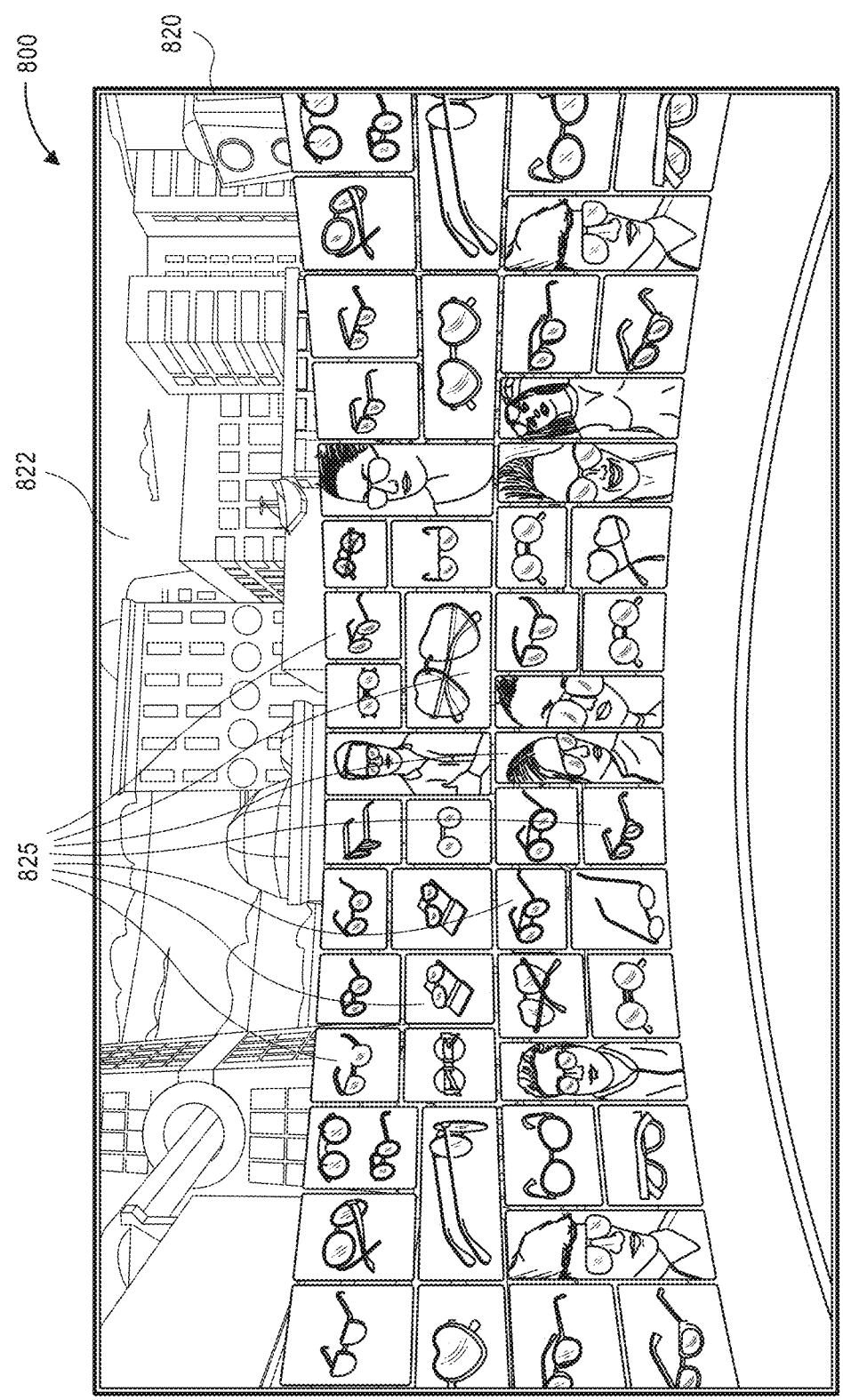
FIG. 8 is a schematic diagram of an example user interface having images modified with complement colors associated with principal colors, according to an implementation.

FIG. 8 is a schematic diagram 800 of an example user interface having images modified with complement colors associated with principal colors, according to an implementation.

The user interface 820 may be an example virtual reality user interface displayed via a virtual reality device or headset in which a plurality of images 825 may wrap at least partially around a virtual position of a user. The user interface 820 may include a background environment 822 that may be a virtual, three-dimensional, simulated model of an environment. As shown in FIG. 8, the plurality of images 825 may each include one or more objects of interest. In addition, as described herein, principal colors may be determined for each of the plurality of images 825, complement colors may be identified based at least in part on the determined principal colors, and complement colors may be applied to at least a portion of each of the plurality of images 825. Further, one or more portions of a background 822 or other objects within the user interface 820 may also be modified to incorporate one or more complement colors based at least in part on the determined principal colors. Moreover, responsive to receiving a selection of one of the plurality of images 825, one or more portions of a background 822 or other objects within the user interface 820 may be modified to incorporate the complement color applied to the selected image.

Furthermore, within a user interface 820 displaying a plurality of images 825 as shown in FIG. 8 or within other user interfaces displaying a plurality of images via other computing devices and/or display devices and in other formats or arrangements, one or more of the plurality of images may be rearranged or reordered based at least in part on the applied complement colors. In some example embodiments, images having the same or similar applied complement colors may be rearranged in groups or adjacent one another to provide a more unified visual appearance to the user interface. In other example embodiments, images having different applied complement colors may be rearranged next to each other to provide a more varied visual appearance to the user interface. Other rearrangements of the plurality of images are also possible, such as rearrangements in columns, rows, bands, strips, circles, shapes, patterns, other formations, or at random based at least in part on the applied complement colors.

In still further example embodiments of user interfaces displaying a plurality of images, tiles, sections, or portions, each of the plurality of images, tiles, sections, or portions may be evaluated to determine a principal color for each section or portion or a principal color for the plurality of sections or portions together, and one or more complement colors may be identified and applied to one or more of the plurality of sections or portions. For example embodiments in which various of the plurality of sections or portions of the user interface may originate from or be created by different sources or entities, the determination of a principal color for the plurality of sections or portions together and the subsequent application of a complement color to the user interface based at least in part on the principal color may provide a more unified or cohesive experience to a viewer of the user interface. As described herein, the determination of principal colors for each of the plurality of sections or portions may include various object recognition algorithms and/or evaluation of color values or aspects of subsets of pixels. In alternative embodiments, the determination of a principal color for a section or portion may rely primarily or exclusively on additional information or metadata associated with the section or portion, e.g., an indication of a color value included as metadata associated with a section or portion, thereby reducing the processing load and increasing the speed by which principal colors may be determined and complement colors may be identified and applied. Further, as described herein, in addition to applying complement colors to one or more sections or portions of a user interface, the background or a portion thereof and any other parts of a user interface may also be modified based on the complement colors.

Figure 9:
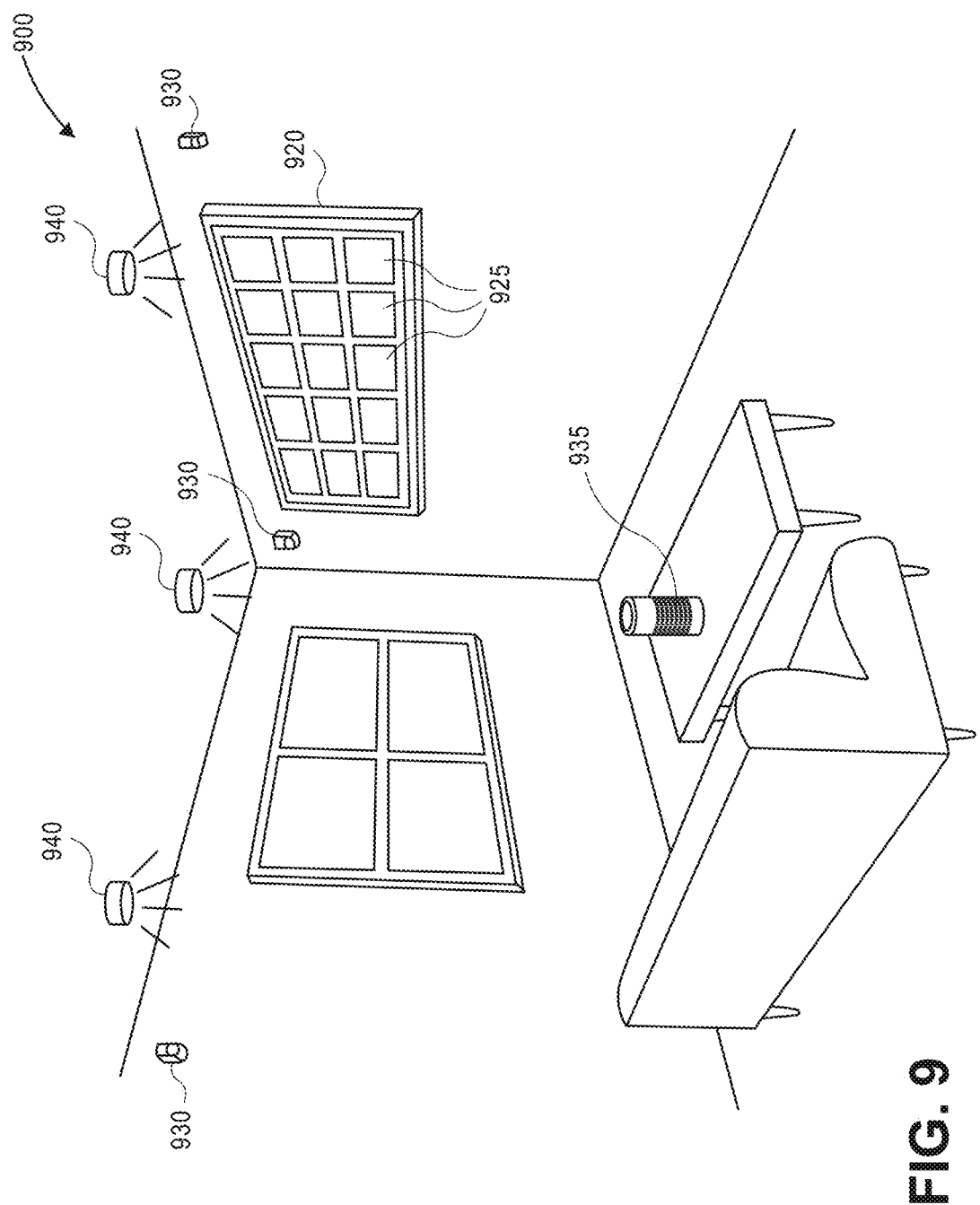
FIG. 9 is a schematic diagram of an example environment within which a complement color associated with a principal color may be applied, according to an implementation.

FIG. 9 is a schematic diagram of an example environment 900 within which a complement color associated with a principal color may be applied, according to an implementation.

The example environment 900 may include a user interface 920 displayed via a computing device and/or display device, one or more sensors 930, one or more smart home devices, connected devices, or other input/output devices 935, and one or more illumination elements 940. Each of the elements of the example environment 900 may be in communication with each other. For example, the computing device and/or display device via which the user interface 920 is displayed may be in communication with and/or may receive and/or send data or instructions to and from the one or more sensors 930 and/or the one or more illumination elements 940. In addition, the one or more smart home devices or other input/output devices 935 may also be in communication with and/or may receive and/or send data or instructions to and from the computing device and/or display device via which the user interface 920 is displayed, the one or more sensors 930, and/or the one or more illumination elements 940.

The user interface 920 may be an example user interface displayed via a computing device and/or display device, such as a television screen, a monitor, a projector, or other display device, in which a plurality of images 925 may be displayed simultaneously and/or adjacent one another. The user interface 920 may include a background, and the plurality of images 925 may each include one or more objects of interest. In addition, as described herein, principal colors may be determined for each of the plurality of images 925, complement colors may be identified based at least in part on the determined principal colors, and complement colors may be applied to at least a portion of each of the plurality of images 925. Further, one or more portions of a background or other objects within the user interface 920 may also be modified to incorporate one or more complement colors based at least in part on the determined principal colors. Moreover, responsive to receiving a selection of one of the plurality of images 925, one or more portions of a background or other objects within the user interface 920 may be modified to incorporate the complement color applied to the selected image.

Furthermore, within a user interface 920 displaying a plurality of images 925 as shown in FIG. 9 or within other user interfaces displaying a plurality of images via other computing devices and/or display devices and in other formats or arrangements, one or more of the plurality of images may be rearranged or reordered based at least in part on the applied complement colors. In some example embodiments, images having the same or similar applied complement colors may be rearranged in groups or adjacent one another to provide a more unified visual appearance to the user interface. In other example embodiments, images having different applied complement colors may be rearranged next to each other to provide a more varied visual appearance to the user interface. Other rearrangements of the plurality of images are also possible, such as rearrangements in columns, rows, bands, strips, circles, shapes, patterns, other formations, or at random based at least in part on the applied complement colors.

In addition, the one or more sensors 930 may be placed at various locations within the environment 900 and detect various aspects of the environment. For example, the one or more sensors 930 may include light sensors, time or time of day sensors, temperature sensors, humidity sensors, audio sensors such as microphones, imaging sensors such as cameras, or other types of sensors to detect aspects of the environment. Based at least in part on aspects of the environment detected by one or more sensors 930, the complement colors to be applied to one or more of the plurality of images 925 may be adjusted or modified in various manners.

For example, if the light sensors detect a low level of ambient light brightness level or a time of day corresponding to evening hours, the complement colors to be applied to one or more of the plurality of images 925 may be adjusted to be relatively darker shades of the complement colors, e.g., having lower lightness or value levels in an HSL or HSV color model. In contrast, if the light sensors detect a high level of ambient light brightness level or a time of day corresponding to daytime hours, the complement colors to be applied to one or more of the plurality of images 925 may be adjusted to be relatively brighter tints of the complement colors, e.g., having higher lightness or value levels in an HSL or HSV color model. Further, if the light sensors detect a particular ambient light color value within the environment, the complement colors to be applied to one or more of the plurality of images 925 may be adjusted to be similar to the detected ambient light color value within the environment. In contrast, if the light sensors detect a particular ambient light color value within the environment, the complement colors to be applied to one or more of the plurality of images 925 may be adjusted to be different from the detected ambient light color value within the environment.

In addition, if the temperature sensors detect a relatively warm temperature or the humidity sensors detect a relatively humid environment, the complement colors to be applied to one or more of the plurality of images 925 may be adjusted to be relatively cooler hues of the complement colors, e.g., having hue values in the green, cyan, or blue ranges in an HSL or HSV color model. In contrast, if the temperature sensors detect a relatively cool temperature or the humidity sensors detect a relatively dry environment, the complement colors to be applied to one or more of the plurality of images 925 may be adjusted to be relatively warmer hues of the complement colors, e.g., having hue values in the red, orange, or purple ranges in an HSL or HSV color model.

The one or more illumination elements 940 may be lighting elements, light bulbs, LED lights, or other types of illumination elements. The one or more illumination elements 940 may be capable of emitting light at various wavelengths and with various characteristics, e.g., having various color values including some or all the color values or aspects described herein with respect to various color models, spaces, or systems. The one or more illumination elements 940 may selectively emit light with various color values or aspects based at least in part on the complement colors applied to one or more of the plurality of images 925 displayed via the user interface 920. In this manner, the one or more illumination elements 940 may emit light with various color values or aspects similar to the complement colors applied to the plurality of images 925 in order to create a particular theme or mood within the environment 900 for a user. Moreover, responsive to receiving a selection of one of the plurality of images 925, the one or more illumination elements 940 may emit light with various color values or aspects similar to the complement color applied to the selected image.

The one or more illumination elements 940 may also comprise other output elements, such as audio output elements, such that sounds, tones, and/or music may also be emitted by the one or more illumination elements 940 that are selectively emitted based at least in part on the complement colors applied to one or more of the plurality of images 925 displayed via the user interface 920, and/or based at least in part on a selection of one of the plurality of images 925 received from a user. In this manner, the one or more illumination elements 940 may emit audio signals that are selected based at least in part on the complement colors applied to the plurality of images 925 in order to further create a particular theme or mood within the environment 900 for a user. For example, particular color values of complement colors may be associated with particular types, frequencies, or other audio characteristics of sounds, such as pitch, frequency, timbre, volume, duration, or other characteristics.

The one or more smart home devices or other input/output devices 935 may be in communication with one or more of the computing device and/or display device via which the user interface 920 is displayed, the one or more sensors 930, and/or the one or more illumination elements 940. The smart home devices 935 may comprise a computing device, e.g., including at least a processor and a memory, and may be configured to operate as a hub or controller for the various elements in the environment 900, such as the user interface 920, the one or more sensors 930, and/or the one or more illumination elements 940. In some example embodiments, the smart home devices 935 may also include one or more sensors similar to the one or more sensors 930 described herein and may also include one or more illumination or output elements similar to the illumination elements 940 described herein. In addition, the smart home devices 935 may also receive instructions, commands, selections, data, and other inputs from a user in the environment 900, and the inputs from the user may be received via various means, such as voice input, touch input, inputs received via other controllers or input elements in communication with the smart home devices 935, or any other input means. Further, the smart home devices 935 may also provide outputs such as light output, visual output, audio output, or other outputs.

The one or more smart home devices 935 may enable a user to interact with the user interface 920 and the plurality of images 925 displayed via the user interface 920. For example, a user may initiate a search via an input received by the one or more smart home devices 935 for an item, e.g., an object, product, physical item, digital item, service, or any other item that may be purchased, leased, rented, downloaded, viewed, listened to, or otherwise acquired or borrowed for consumption, and the one or more smart home devices 935 and/or the computing device and/or display device via which the user interface 920 is displayed may provide a plurality of images 925 related to the search request received from the user. The plurality of images 925 may have applied complement colors based at least in part on the respective determined principal colors using the systems and methods described herein. Further, the one or more smart home devices 935 may also receive data from the one or more sensors 930, e.g., related to ambient light brightness levels, ambient light color values, ambient temperatures or humidity, ambient sounds and sound characteristics, or other detected aspects of the environment, and the one or more smart home devices 935 may instruct or control operation of the user interface 920, e.g., adjusting or modifying applied complement colors based at least in part on detected aspects of the environment. Further, the one or more smart home devices 935 may also instruct or control operation of the one or more illumination elements 940 based at least in part on the data received from the one or more sensors 930.

In this manner, a user in the environment 900 may be provided with a curated, thematic experience while viewing images 925 via the user interface 920 by not just applying complement colors to the images 925 displayed via the user interface 920, but also by adjusting or modifying the complement colors applied to the images 925 based on detected aspects of the environment and also by outputting, adjusting, or modifying aspects or stimuli within the environment 900 itself based on detected aspects of the environment, including both visual stimuli and audio stimuli. In one particular example, if a user is viewing images 925 via the user interface 920 during evening hours in a relatively dark and quiet environment, such aspects of the environment may be detected so as to avoid displaying images 925 with very bright or starkly white portions that may be uncomfortably bright and also to avoid outputting sounds, tones, or music with very loud volumes or poignant frequencies that may be disrupting and alter the mood of the current environment. Similarly, the one or more illumination elements 940 and other output elements may also be controlled to emit light and/or sounds that will further accentuate the mood of the current environment and not detrimentally affect or drastically alter the mood of the current environment for the user.

Figure 10A:
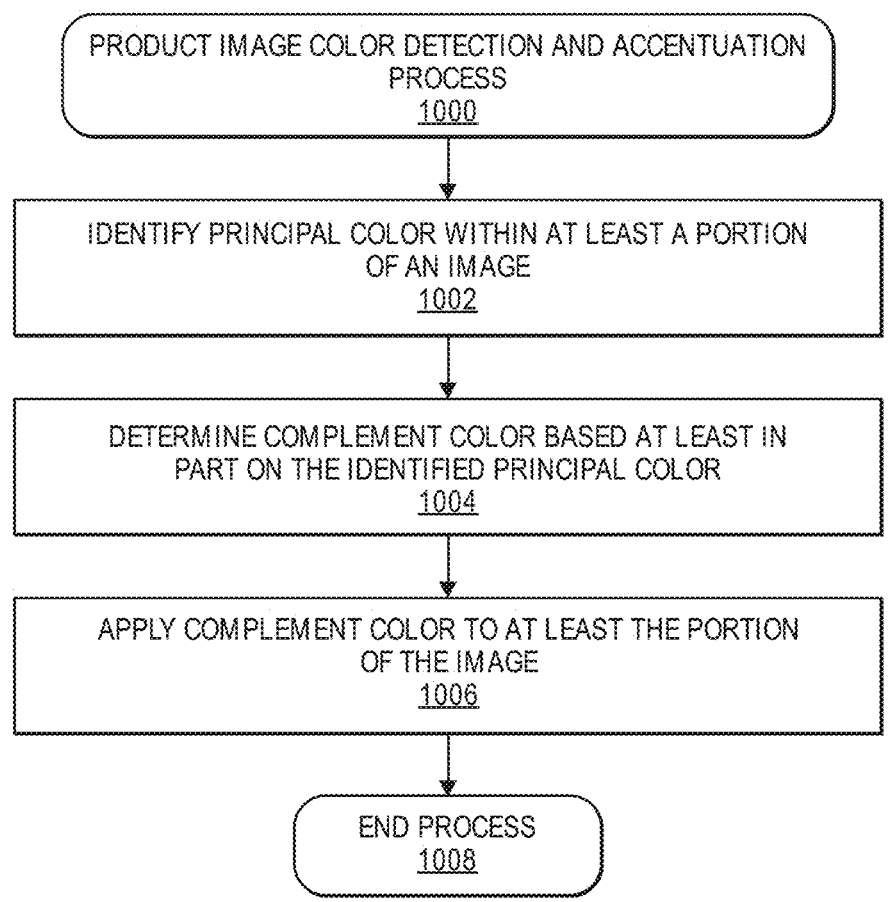
FIG. 10A is a flow diagram illustrating an example product image color detection and accentuation process, according to an implementation.

FIG. 10A is a flow diagram illustrating an example product image color detection and accentuation process 1000, according to an implementation.

The process 1000 may begin by identifying one or more principal colors within at least a portion of an image, as at 1002. As described herein, an entire image may be evaluated, one or more portions or subregions of an image may be evaluated, one or more objects may be recognized within the image using object recognition algorithms, or combinations thereof may be performed. The colors identified within at least a portion of an image may be defined based on any one or more aspects or values of colors in any of the various color models, spaces, or systems. In addition, the one or more principal colors within at least a portion of an image may be determined based on any one or combination of such various aspects or values of colors.

The process 1000 may continue to determine one or more complement colors based at least in part on the identified one or more principal colors, as at 1004. As described herein, a complement color may be a color that is 180 degrees from the determined principal color on a HSL or HSV color wheel, or a complement color may be a color that is defined by any other relationship relative to the determined principal color with reference to any of the various color models, spaces, or systems. Further, complement colors associated with determined principal colors may be defined in one or more tables or databases, and such associations may include one-to-one relationships or one-to-many relationships between complement colors and determined principal colors. Moreover, multiple associations between complement colors and determined principal colors may be defined based on additional information associated with an image, such a category, type, color, name, brand, size, or other information or metadata associated with an object represented in the image. Furthermore, complement colors may be adjusted or modified based at least in part on detected aspects of an environment in which the images may be displayed via a user interface. In one example embodiment, complement colors defined according to an HSV color model may have saturation levels that are approximately 0.1 or lower on a scale of 0 to 1 and/or value levels that are approximately 0.9 or higher on a scale of 0 to 1, such that the complement colors may be relatively light tints of particular hues.

The process 1000 may then proceed to apply the determined one or more complement colors to at least a portion of the image, as at 1006. As described herein, the complement color may be applied as a tile over all or a portion of the image, in which the tile includes the complement color. In addition, the complement color may be applied to all or a portion of the image by adjusting, altering, or modifying color values of pixels of the image based at least in part on the complement color. The adjusted or modified color values of pixels may include any of the various aspects or values of colors in any of the various color models, spaces, or systems. In example embodiments in which the color values of pixels are defined by an RGB color model having values between 0-0-0 and 255-255-255, difference RGB color values may be determined between RGB color values of the complement color and RGB color values of the color white. Then, the difference RGB color values may be subtracted from RGB color values of respective pixels of the image that are to be modified. As further described herein, all or a portion of pixels of an image may be adjusted or modified to incorporate color values of the complement color, such as only pixels that are white, off-white, or having color values above threshold color values, only pixels that are not associated with recognized objects within an image, and/or only pixels within one or more portions or subregions of an image. The process 1000 may then end, as at 1008.

Figure 10B:
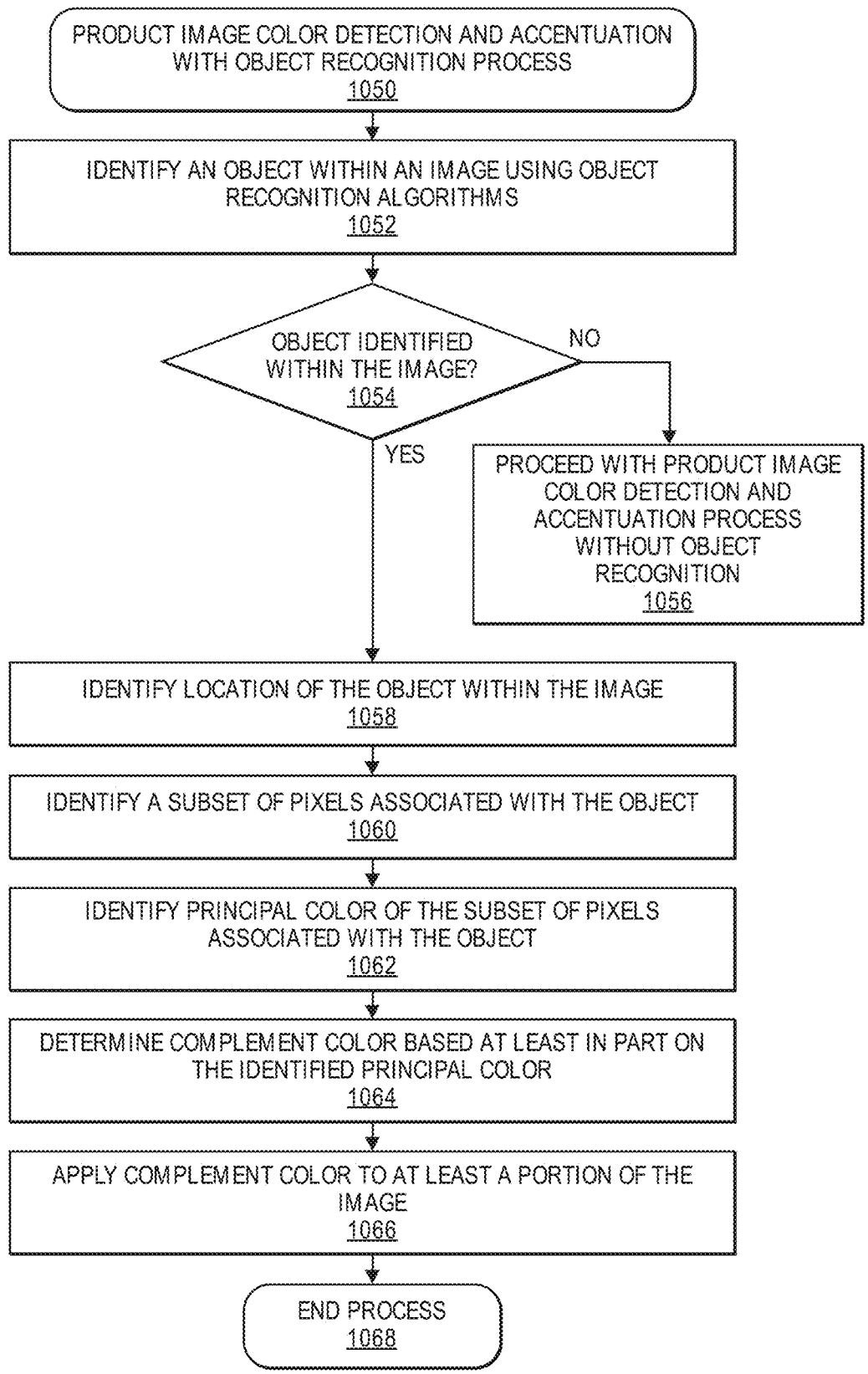
FIG. 10B is a flow diagram illustrating an example product image color detection and accentuation with object recognition process, according to an implementation.

FIG. 10B is a flow diagram illustrating an example product image color detection and accentuation with object recognition process 1050, according to an implementation.

The process 1050 may begin by identifying an object within an image using object recognition algorithms, classifiers, or techniques, as at 1052. Any of various types of object recognition algorithms may be used to detect and recognize an object within the image. In some embodiments, additional information or metadata associated with the image, e.g., category, type, brand, name, color, etc., may also be provided as inputs to the object recognition algorithms to aid the detection and recognition of an object.

The process 1050 may continue to determine whether an object has been identified within the image, as at 1054. If no objects have been identified using various object recognition algorithms, then the process 1050 may proceed with product image color detection and accentuation processes, such as portions of process 1000 shown in FIG. 10A and described herein, without the use of object recognition algorithms, classifiers, or techniques, as at 1056.

Returning to step 1054, if one or more objects have been identified within the image, however, then the process 1050 may proceed to identify a location of the identified object within the image, as at 1058. Various methods or processes may be used to identify a location of the object within the image. In some embodiments, various edge, surface, or feature detection algorithms or techniques may be used to determine locations of portions of the identified object within the image. In addition, the image may be divided into quadrants, sectors, or other regions, and one or more of such quadrants, sectors, or other regions may be identified as including the identified object. Further, other methods or processes for identifying a location of an identified object within an image, e.g., relative to one or more edges or a center of the image, may also be used.

The process 1050 may then continue to identify a subset of pixels associated with the identified object, as at 1060. For example, one or more boundaries of the identified object within the image may be estimated based on outermost positions of one or more pixels associated with the identified object, such that a square, rectangle, circle, other polygon, or other shape, may be positioned approximately around the subset of pixels associated with the identified object. In other example embodiments, an approximate center of the identified object within the image may be determined based on positions of pixels associated with the object, and a circle, oval, square, rectangle, other polygon, or other shape having a defined radius, length, width, or other dimensions, may be positioned around the approximate center of the subset of pixels associated with the identified object. Further, other methods or processes for identifying a subset of pixels associated with a location of an identified object within an image, e.g., relative to one or more edges or a center of the image, may also be used.

The process 1050 may then proceed by identifying one or more principal colors of the subset of pixels associated with the identified object within the image, as at 1062. As described herein, the colors identified within the subset of pixels associated with the identified object may be defined based on any one or more aspects or values of colors in any of the various color models, spaces, or systems. In addition, the one or more principal colors within the subset of pixels associated with the identified object within the image may be determined based on any one or combination of such various aspects or values of colors.

The process 1050 may then proceed to determine one or more complement colors based at least in part on the identified one or more principal colors, as at 1064. As described herein, a complement color may be a color that is 180 degrees from the determined principal color on a HSL or HSV color wheel, or a complement color may be a color that is defined by any other relationship relative to the determined principal color with reference to any of the various color models, spaces, or systems. Further, complement colors associated with determined principal colors may be defined in one or more tables or databases, and such associations may include one-to-one relationships or one-to-many relationships between complement colors and determined principal colors. Moreover, multiple associations between complement colors and determined principal colors may be defined based on additional information associated with an image, such a category, type, color, name, brand, size, or other information or metadata associated with an object represented in the image. Furthermore, complement colors may be adjusted or modified based at least in part on detected aspects of an environment in which the images may be displayed via a user interface. In one example embodiment, complement colors defined according to an HSV color model may have saturation levels that are approximately 0.1 or lower on a scale of 0 to 1 and/or value levels that are approximately 0.9 or higher on a scale of 0 to 1, such that the complement colors may be relatively light tints of particular hues.

The process 1050 may then proceed to apply the determined one or more complement colors to at least a portion of the image, as at 1066. As described herein, the complement color may be applied as a tile over all or a portion of the image, in which the tile includes the complement color. In addition, the complement color may be applied to all or a portion of the image by adjusting, altering, or modifying color values of pixels of the image based at least in part on the complement color. The adjusted or modified color values of pixels may include any of the various aspects or values of colors in any of the various color models, spaces, or systems. In example embodiments in which the color values of pixels are defined by an RGB color model having values between 0-0-0 and 255-255-255, difference RGB color values may be determined between RGB color values of the complement color and RGB color values of the color white. Then, the difference RGB color values may be subtracted from RGB color values of respective pixels of the image that are to be modified. As further described herein, all or a portion of pixels of an image may be adjusted or modified to incorporate color values of the complement color, such as only pixels that are white, off-white, or having color values above threshold color values, only pixels that are associated with the subset of pixels associated with the identified object within an image, only pixels that are not associated with the subset of pixels associated with the identified object within an image, and/or only pixels within one or more portions or subregions of an image. The process 1050 may then end, as at 1068.

By the processes described with respect to FIGS. 10A and 10B, images may be accentuated by applying complement colors based at least in part on determined principal colors within an image, such that an object of interest represented within the image may be emphasized and presented in a visually attractive manner to the user, while also maintaining a theme or mood associated with an environment of the user.

FIG. 11A is a schematic diagram of an example tenth image 1100A within which an edge may be detected and manipulated, according to an implementation.

The tenth image 1100A may include a white (or off-white) background and one or more objects of interest, e.g., a replacement battery held in a person's hand. In addition to the replacement battery, the image 1100A may also include human body objects, such as fingers, hands, arms, and other objects. As shown in the upper image of FIG. 11A, the replacement battery may be the primary object of interest within the image 1100A, and the image 1100A may have a clearly visible cropped edge 1140A associated with the hand or wrist.

The upper image of FIG. 11A may be evaluated to identify any cropped edges, such as cropped edge 1140A. For example, for each of the four edges of the image and starting from the edge, pixels along a line parallel to the edge may be evaluated to determine color values and a number of pixels having particular color values. The color values of pixels along each line may be compared to a threshold color value, and the number of pixels having particular color values above the threshold color value may be compared to a threshold number value.

In example embodiments, for a line of pixels starting from the edge, if the number of pixels having particular color values is not greater than the threshold number value, and if no color values of any pixels are greater (e.g., darker) than the threshold color value, then it may be determined that the line of pixels forms part of the background. In addition, for a line of pixels starting from the edge, if the number of pixels having particular color values is not greater than the threshold number value, and if the color values of at least one pixel are greater (e.g., darker) than the threshold color value, then it may be determined that the line of pixels forms part of the image, such that the edge of the image currently being evaluated need not be further cropped. Further, for a line of pixels starting from the edge, if the number of pixels having particular color values greater (e.g., darker) than the threshold color value is greater than the threshold number value, then it may be determined that the line of pixels forms part of a cropped edge within the image, such that the edge of the image currently being evaluated may be further cropped along the current line of pixels being evaluated.

In this manner, the upper image of FIG. 11A may be further cropped along cropped edge 1140A, e.g., from the left edge of the image, as shown in the lower image of FIG. 11A, and the other three edges of the image, e.g., the upper edge, right edge, and lower edge, may not be further cropped. Then, the clearly visible cropped edge 1140A in the upper image may be less visible or not visible at all as a cropped edge in the lower image. As a result, a user may be less distracted from an object of interest represented within an image by such clearly visible cropped edges of images. Further, after further cropping one or more edges of an image to eliminate clearly visible cropped edges of images, the image may be zoomed, magnified, shifted, and/or translated while maintaining an aspect ratio of the image to utilize the available space for the image. In this manner, the object of interest may be further accentuated by increasing a size of the object while removing unused space and distracting visual elements from within the image.

In alternative example embodiments with respect to FIG. 11A, the upper image may be cropped using various auto-cropping algorithms that remove white space from edges of images. The resulting image from such auto-cropping algorithms may have a boundary 1142A as schematically shown with dashed lines in FIG. 11A. Generally, auto-cropped images may be placed in the center of an available space of an image tile 1145A, as shown in the upper image of FIG. 11A. As a result, the cropped edge 1140A of the object within the image along the left side of the boundary 1142A may be clearly visible to a viewer of the image.

According to example embodiments described herein, one or more cropped edges, such as cropped edge 1140A, of an object within an image may be detected. For example, as discussed above, in order to determine whether any edges of an object along the boundary 1142A of the image have been cropped, pixels along each side of the boundary 1142A of the image may be evaluated and compared to one or more of a threshold color value or a threshold number value for pixels having particular color values. In some examples, if the number of pixels along a side of a boundary of an image having particular color values greater (e.g., darker) than the threshold color value is greater than the threshold number value, then it may be determined that a cropped edge of an object within the image is present along the side of the boundary 1142A. Each of the sides of the boundary 1142A of the image may be similarly evaluated to determine whether a cropped edge of an object is detected along the respective sides of the boundary 1142A.

If no cropped edges of an object are detected on any sides of a boundary of an image, then the image may be placed in a center of an available space of an image tile. In addition, the image may be zoomed or magnified while maintaining an aspect ratio of the image to utilize a maximum amount of the available space of the image tile. In some embodiments, at least a defined amount of white space may be maintained at each side of the boundary of an image for which no cropped edges of an object are detected.

If one or more cropped edges of an object are detected on one or more sides of a boundary of an image, then the image may be shifted or translated within the available space of an image tile such that the one or more cropped edges is aligned with respective edges of the image tile. In addition, the image may be zoomed or magnified while maintaining an aspect ratio of the image to utilize a maximum amount of the available space of the image tile. In some embodiments, at least a defined amount of white space may be maintained at each side of the boundary of an image for which no cropped edges of an object are detected.

In the example shown in FIG. 11A, the lower image may be shifted such that the cropped edge 1140A along the left side of the boundary 1142A is aligned with a left edge of the available space of the image tile 1145A. In addition, the image may be zoomed or magnified while maintaining an aspect ratio of the image and/or while maintaining at least a defined amount of white space at the remaining three sides, e.g., upper side, right side, and lower side, of the boundary of the image for which no cropped edges of an object were detected.

As a result, a user may be less distracted from an object of interest represented within an image by such clearly visible cropped edges of images. Further, after changing a position and/or magnification of an image to eliminate clearly visible cropped edges of images while maintaining an aspect ratio of the image to utilize the available space for the image, the object of interest may be further accentuated by increasing a size of the object while removing unused space and distracting visual elements from within the image.

FIG. 11B is a schematic diagram of an example eleventh image 1100B within which an edge may be detected and manipulated, according to an implementation.

The eleventh image 1100B may include a white (or off-white) background and one or more objects of interest, e.g., a women's skirt worn by a person. In addition to the skirt, the image 1100B may also include human body objects, such as arms, hands, legs, feet and other objects, e.g., shoes. As shown in the upper image of FIG. 11B, the skirt may be the primary object of interest within the image 1100B, and the image 1100B may have clearly visible cropped edges 1140B-1, 1140B-2 associated with the person and a shadow of the person.

The upper image of FIG. 11B may be evaluated to identify any cropped edges, such as cropped edges 1140B-1, 1140B-2. For example, for each of the four edges of the image and starting from the edge, pixels along a line parallel to the edge may be evaluated to determine color values and a number of pixels having particular color values. The color values of pixels along each line may be compared to a threshold color value, and the number of pixels having particular color values above the threshold color value may be compared to a threshold number value.

In example embodiments, for a line of pixels starting from the edge, if the number of pixels having particular color values is not greater than the threshold number value, and if no color values of any pixels are greater (e.g., darker) than the threshold color value, then it may be determined that the line of pixels forms part of the background. In addition, for a line of pixels starting from the edge, if the number of pixels having particular color values is not greater than the threshold number value, and if the color values of at least one pixel are greater (e.g., darker) than the threshold color value, then it may be determined that the line of pixels forms part of the image, such that the edge of the image currently being evaluated need not be further cropped. Further, for a line of pixels starting from the edge, if the number of pixels having particular color values greater (e.g., darker) than the threshold color value is greater than the threshold number value, then it may be determined that the line of pixels forms part of a cropped edge within the image, such that the edge of the image currently being evaluated may be further cropped along the current line of pixels being evaluated.

In this manner, the upper image of FIG. 11B may be further cropped along cropped edges 1140B-1, 1140B-2, e.g., from the upper and lower edges of the image, as shown in the lower image of FIG. 11B, and the other two edges of the image, e.g., the right edge and lower edge, may not be further cropped. Then, the clearly visible cropped edges 1140B-1, 1140B-2 in the upper image may be less visible or not visible at all as cropped edges in the lower image. As a result, a user may be less distracted from an object of interest represented within an image by such clearly visible cropped edges of images. Further, after further cropping one or more edges of an image to eliminate clearly visible cropped edges of images, the image may be zoomed, magnified, shifted, and/or translated while maintaining an aspect ratio of the image to utilize the available space for the image. In this manner, the object of interest may be further accentuated by increasing a size of the object while removing unused space and distracting visual elements from within the image.

In alternative example embodiments with respect to FIG. 11B, the upper image may be cropped using various auto-cropping algorithms that remove white space from edges of images. The resulting image from such auto-cropping algorithms may have a boundary 1142B as schematically shown with dashed lines in FIG. 11B. Generally, auto-cropped images may be placed in the center of an available space of an image tile 1145B, as shown in the upper image of FIG. 11B. As a result, the cropped edges 1140B-1, 1140B-2 of the object within the image along the upper and lower sides of the boundary 1142B may be clearly visible to a viewer of the image.

According to example embodiments described herein, one or more cropped edges, such as cropped edges 1140B-1, 1140B-2, of an object within an image may be detected. For example, as discussed above, in order to determine whether any edges of an object along the boundary 1142B of the image have been cropped, pixels along each side of the boundary 1142B of the image may be evaluated and compared to one or more of a threshold color value or a threshold number value for pixels having particular color values. In some examples, if the number of pixels along a side of a boundary of an image having particular color values greater (e.g., darker) than the threshold color value is greater than the threshold number value, then it may be determined that a cropped edge of an object within the image is present along the side of the boundary 1142B. Each of the sides of the boundary 1142B of the image may be similarly evaluated to determine whether a cropped edge of an object is detected along the respective sides of the boundary 1142B.

If no cropped edges of an object are detected on any sides of a boundary of an image, then the image may be placed in a center of an available space of an image tile. In addition, the image may be zoomed or magnified while maintaining an aspect ratio of the image to utilize a maximum amount of the available space of the image tile. In some embodiments, at least a defined amount of white space may be maintained at each side of the boundary of an image for which no cropped edges of an object are detected.

If one or more cropped edges of an object are detected on one or more sides of a boundary of an image, then the image may be shifted or translated within the available space of an image tile such that the one or more cropped edges is aligned with respective edges of the image tile. In addition, the image may be zoomed or magnified while maintaining an aspect ratio of the image to utilize a maximum amount of the available space of the image tile. In some embodiments, at least a defined amount of white space may be maintained at each side of the boundary of an image for which no cropped edges of an object are detected.

In the example shown in FIG. 11B, the lower image may be shifted such that the cropped edge 1140B-1 along the upper side of the boundary 1142B is aligned with an upper edge of the available space of the image tile 1145B. In addition, the image may be zoomed or magnified while maintaining an aspect ratio of the image, such that the cropped edge 1140B-2 along the lower side of the boundary 1142B is aligned with a lower edge of the available space of the image tile 1145B. In other embodiments, the lower image may first be shifted to align the cropped edge 1140B-2 with a lower side of the boundary 1142B, and then the image may be zoomed or magnified such that the cropped edge 1140B-1 along the upper side of the boundary 1142B is aligned with an upper edge of the available space of the image tile 1145B. In still other embodiments, the lower image may be positioned in a center of the image tile 1145B and zoomed or magnified until the cropped edge 1140B-1 along the upper side of the boundary 1142B is aligned with an upper edge of the image tile 1145B and/or the cropped edge 1140B-2 along the lower side of the boundary 1142B is aligned with a lower edge of the image tile 1145B, without shifting or translating the image within the image tile 1145B. Other combinations of shifting, translating, zooming, and/or magnifying may also be possible in order to align cropped edges along boundaries of images with edges of image tiles. Further, at least a defined amount of white space may be maintained at the remaining two sides, e.g., right side and left side, of the boundary of the image for which no cropped edges of an object were detected.

As a result, a user may be less distracted from an object of interest represented within an image by such clearly visible cropped edges of images. Further, after changing a position and/or magnification of an image to eliminate clearly visible cropped edges of images while maintaining an aspect ratio of the image to utilize the available space for the image, the object of interest may be further accentuated by increasing a size of the object while removing unused space and distracting visual elements from within the image.

Figure 12A:
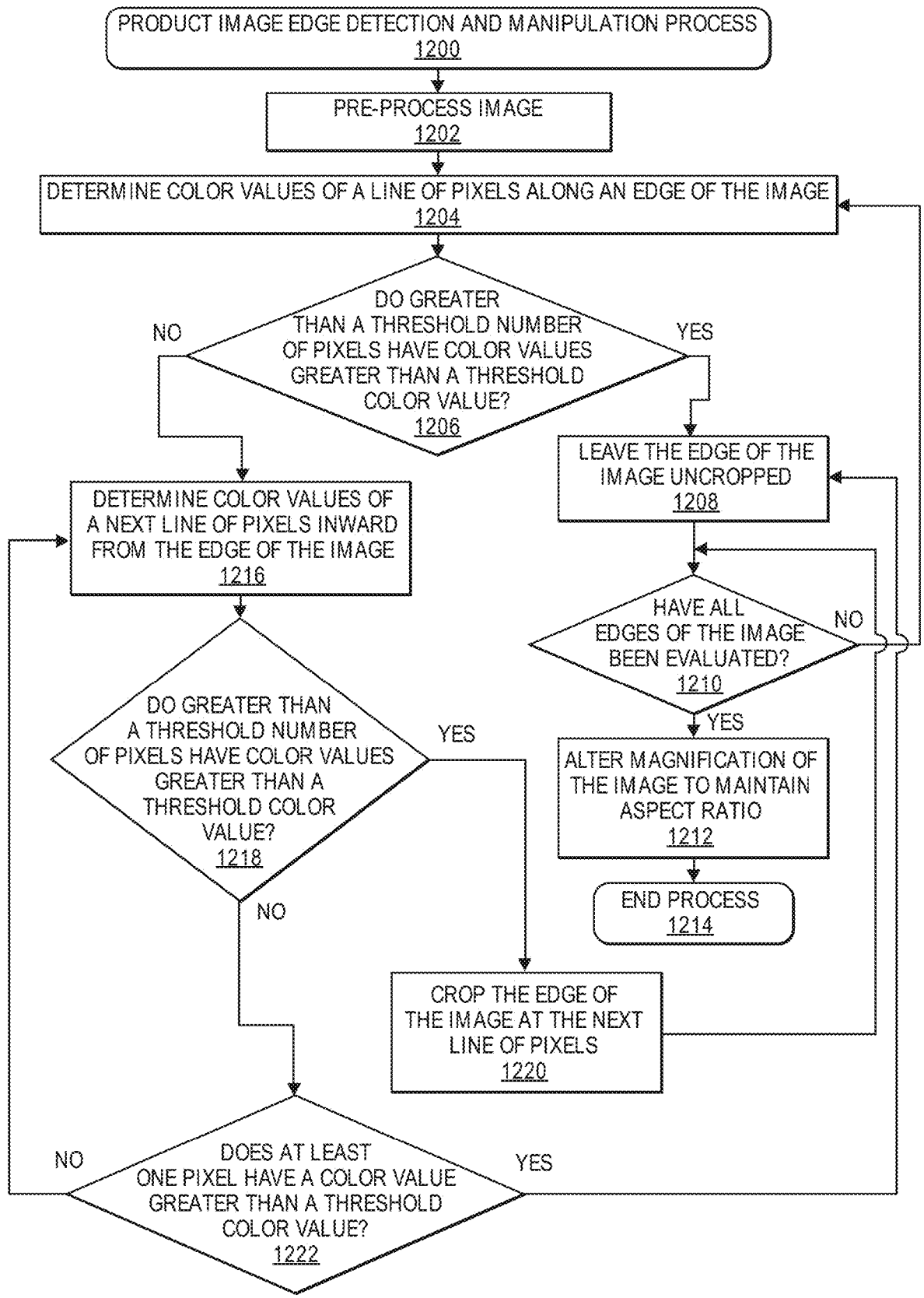
FIG. 12A is a flow diagram illustrating an example product image edge detection and manipulation process, according to an implementation.

FIG. 12A is a flow diagram illustrating an example product image edge detection and manipulation process 1200, according to an implementation.

The process 1200 may begin by pre-processing an image, as at 1202. For example, pre-processing may include one or more auto-cropping algorithms, color adjusting algorithms, image filtering algorithms, contrast adjusting algorithms, brightness adjusting algorithms, or any other algorithms or processes to process images. In some example embodiments, pre-processing may include cropping, zooming, translating, and/or rotating an image based at least in part on the size of a tile or block within which the image is to be placed.

The process 1200 may continue by determining color values of a line of pixels along an edge of the image, as at 1204. Any edge of an image may be selected as a starting edge for this step of the process 1200. The color values of the line of pixels along the edge may be determined based on any aspects or values of colors in any of the various color models, spaces, or systems. For example, the color values may be determined based on hue-saturation-lightness levels of an HSL color model, hue-saturation-value levels of an HSV color model, red-green-blue values of an RGB color model, hexadecimal values of a hexadecimal color model, or any other color values of other color models, spaces, or systems.

The process 1200 may then proceed to determine whether greater than a threshold number of pixels have color values that are greater (e.g., darker) than a threshold color value, as at 1206. For example, if at least a threshold number of pixels along the edge of the image have color values that are greater (e.g., darker) than a threshold color value, then it may be determined that at least a portion of the image is present at the edge of the image. If this is the case, then the process 1200 may proceed to leave the edge of the image uncropped, as at 1208, since at least a portion of the image has been determined to be present at the edge of the image.

The process 1200 may then proceed to determine whether all edges of the image have been evaluated, as at 1210. In the example embodiments described herein, an image may have four edges. In other example embodiments, an image may have fewer or greater number of edges that may be evaluated by the systems and methods described herein. If all edges of the image have been evaluated, then the process 1200 may continue to alter the magnification, zoom, translation, or other characteristics while maintaining an aspect ratio of the image, as at 1212. The alterations may be performed to reduce or eliminate any unused space in the tile or block within which the image is presented so as to accentuate an object of interest represented in the image and reduce or remove any visually distracting portions of the image. The process 1200 may then end, as at 1214.

If, however, it is determined that all edges have not been evaluated at 1210, then the process 1200 may return to determine color values of a line of pixels along another edge of the image, as at 1204. Then, the process 1200 may proceed for the other edge of the image as described herein.

Returning to 1206, if it is determined that at least a threshold number of pixels along the edge of the image do not have color values that are greater (e.g., darker) than a threshold color value, then it may be determined that no portion of the image is present at the edge of the image. If this is the case, then the process 1200 may proceed to determine color values of a next line of pixels inward from the edge of the image, as at 1216. As described herein, the color values of the next line of pixels along the edge may be determined based on any aspects or values of colors in any of the various color models, spaces, or systems. For example, the color values may be determined based on hue-saturation-lightness levels of an HSL color model, hue-saturation-value levels of an HSV color model, red-green-blue values of an RGB color model, hexadecimal values of a hexadecimal color model, or any other color values of other color models, spaces, or systems.

The process 1200 may then proceed to determine whether greater than a threshold number of pixels of the next line of pixels have color values that are greater (e.g., darker) than a threshold color value, as at 1218. For example, if at least a threshold number of pixels along the next line of the image have color values that are greater (e.g., darker) than a threshold color value, then it may be determined that a visibly cropped edge of the image is present at the next line of the image. If this is the case, then the process 1200 may proceed to crop the edge of the image at the next line of pixels, as at 1220, since a visibly cropped edge has been determined to be present at the next line of pixels. Then, the process 1200 may continue to determine whether all edges of the image have been evaluated, as at 1210, and the process 1200 may proceed from that step as described herein.

Returning to 1218, if it is determined that at least a threshold number of pixels of the next line of pixels of the image do not have color values that are greater (e.g., darker) than a threshold color value, then it may be determined whether at least one pixel of the next line of pixels of the image has a color value greater (e.g., darker) than a threshold color value, as at 1222. If it is determined that at least one pixel of the next line of pixels of the image has a color value greater (e.g., darker) than a threshold color value, then it may be determined that at least a portion of the image is present at the next line of pixels of the image. If this is the case, then the process 1200 may proceed to leave the edge of the image uncropped, as at 1208, since at least a portion of the image has been determined to be present at the next line of pixels of the image, and the process 1200 may proceed forward from that step as described herein. Although step 1222 has been described with respect to at least one pixel of the next line of pixels having a color value greater (e.g., darker) than a threshold color value, this step 1222 may instead determine whether at least some pixels of the next line of pixels have a color value greater (e.g., darker) than a threshold color value, in which at least some pixels may be defined as a second threshold number smaller than the threshold number described with reference to steps 1206 and 1218.

Returning to 1222, if it is determined that no pixels (or fewer than a second threshold number of pixels) of the next line of pixels of the image has a color value greater (e.g., darker) than a threshold color value, then it may be determined that no portion of the image is present at the next line of pixels of the image. If this is the case, then the process 1200 may proceed to determine color values of a next line of pixels inward from the previously evaluated line of pixels of the image, as at 1216, and the process 1200 may proceed from that step as described herein.

Figure 12B:
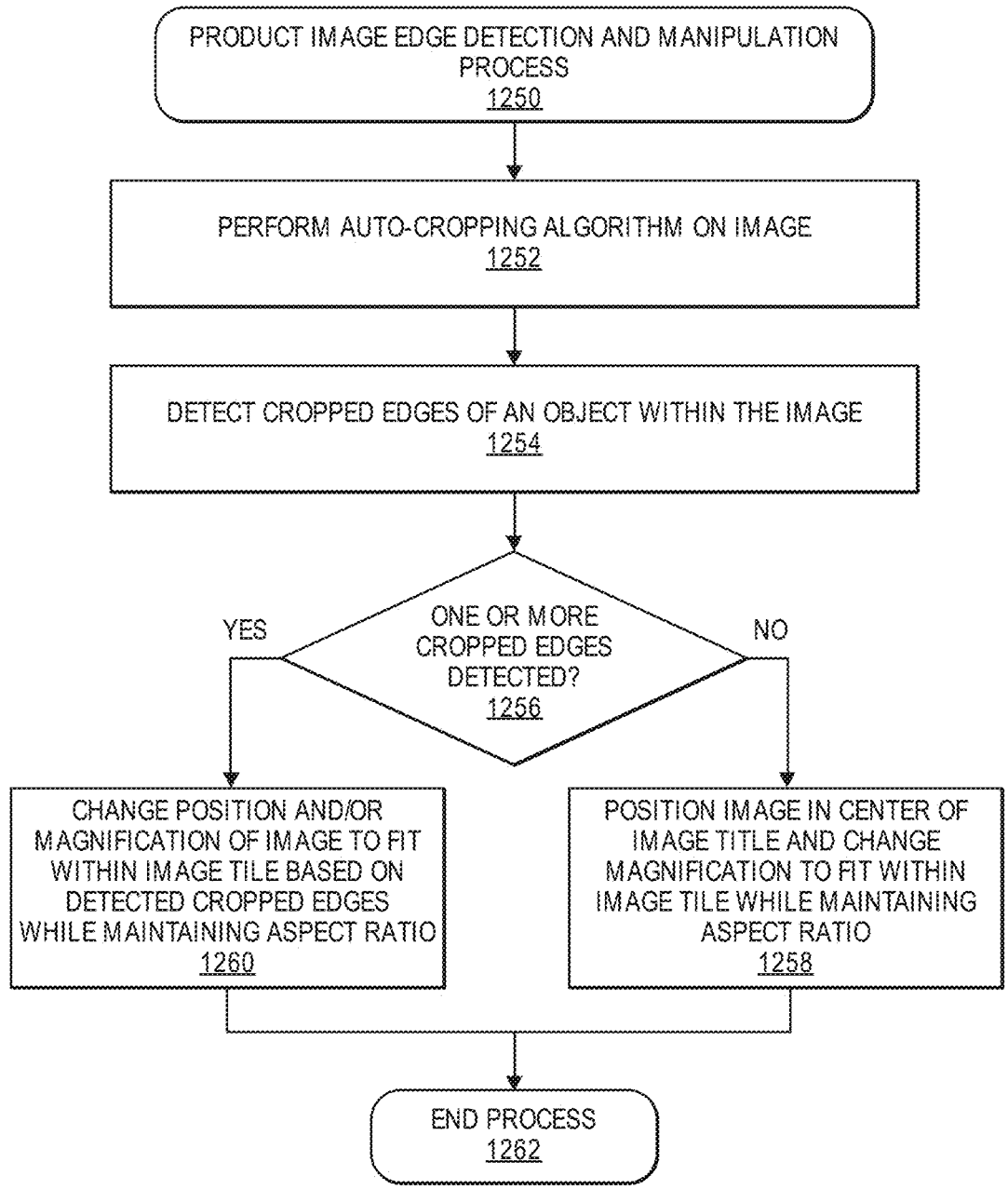
FIG. 12B is another flow diagram illustrating another example product image edge detection and manipulation process, according to an implementation.

FIG. 12B is another flow diagram illustrating another example product image edge detection and manipulation process 1250, according to an implementation.

The process 1250 may begin by performing or running one or more auto-cropping algorithms on an image, as at 1252. Generally, such auto-cropping algorithms may remove white space around edges of an image. For example, some example auto-cropping algorithms may return a generally rectangular or square image in which, for each edge of the image, all white space is removed up to a line of pixels parallel to the edge having at least one pixel with a color value darker than a threshold color value.

The process 1250 may continue to detect one or more cropped edges of an object within the image along edges of the image, as at 1254. For example, as described herein, pixels along each edge of the image may be evaluated relative to one or more of a threshold color value or a threshold number value of pixels having a particular color value. In some examples, if the number of pixels along an edge of the image having particular color values greater (e.g., darker) than the threshold color value is greater than the threshold number value, then it may be determined that a cropped edge of an object within the image is present along the edge of the image. Each of the edges of the image may be similarly evaluated to determine whether a cropped edge of an object is detected along the respective edges of the image.

Then, the process 1250 may proceed to determine whether one or more cropped edges of an object within the image have been detected along edges of the image, as at 1256. If no cropped edges of an object have been detected along any edges of the image, then the process 1250 may continue to position the image in the center of an image tile and/or change a magnification of the image to fit within the image tile, as at 1258. For example, the centered image within the image tile may be zoomed or magnified to utilize a maximum amount of available space within the image tile while maintaining an aspect ratio of the image. In addition, in some embodiments, at least a defined amount of white space may be maintained at all edges of the image relative to edges of the image tile. The process may then end, as at 1262.

Returning to step 1256, if one or more cropped edges of an object have been detected along one or more edges of the image, then the process 1250 may continue to change a position and/or a magnification of the image to fit within the image tile, as at 1260. For example, if one cropped edge of an object has been detected along one edge of the image, then the image may be shifted or translated such that the cropped edge is aligned with an edge of the image tile. Then, the image may be zoomed or magnified to utilize a maximum amount of available space within the image tile while maintaining an aspect ratio of the image. In addition, in some embodiments, at least a defined amount of white space may be maintained at the remaining three edges of the image relative to edges of the image tile.

In another example, if two cropped edges of an object have been detected along adjacent edges of the image, then the image may be shifted or translated such that both cropped edges are aligned with respective edges of the image tile. Then, the image may be zoomed or magnified to utilize a maximum amount of available space within the image tile while maintaining an aspect ratio of the image. In addition, in some embodiments, at least a defined amount of white space may be maintained at the remaining two edges of the image relative to edges of the image tile.

In still another example, if two cropped edges of an object have been detected along opposite edges of the image, then the image may be shifted or translated such that one cropped edge is aligned with a respective edge of the image tile. Then, the image may be zoomed or magnified to utilize a maximum amount of available space within the image tile while maintaining an aspect ratio of the image and/or up to a size at which the other, opposite cropped edge is aligned with a respective edge of the image tile. In addition, in some embodiments, at least a defined amount of white space may be maintained at the remaining two opposing, uncropped edges of the image relative to edges of the image tile.

In yet another example, if three cropped edges of an object have been detected along edges of the image, then the image may be shifted or translated such that one or two cropped edges are aligned with respective edges of the image tile. Then, the image may be zoomed or magnified to utilize a maximum amount of available space within the image tile while maintaining an aspect ratio of the image and/or up to a size at which the remaining one or two cropped edges are aligned with respective edges of the image tile. In addition, in some embodiments, at least a defined amount of white space may be maintained at the remaining one, uncropped edge of the image relative to edges of the image tile.

In a further example, if four cropped edges of an object have been detected along all four edges of the image, then the image may be shifted or translated such that one or two cropped edges are aligned with respective edges of the image tile. Then, the image may be zoomed or magnified to utilize a maximum amount of available space within the image tile while maintaining an aspect ratio of the image and/or up to a size at which the remaining one or two cropped edges are aligned with respective edges of the image tile.

For any of the embodiments described herein, an aspect ratio of the image may also be altered to align one or more cropped edges with respective edges of the image tile. The amount of change to the aspect ratio of an image may be limited by an upper threshold amount or upper threshold percentage in order not to detrimentally alter the representation of an object of interest within the image as perceived by a viewer. The process may then end, as at 1262.

In further example embodiments, either of the processes 1200, 1250 may be modified to use object recognition algorithms, classifiers, or techniques to detect and recognize an object within an image, as described herein at least in part with respect to FIG. 10B. For example, if an object is identified within an image, a location and/or subset of pixels associated with the identified object within the image may be determined, and the detection of cropped edges of an object within an image may be based on the location and/or subset of pixels associated with the identified object. In addition, the processes may determine whether the identified object is fully contained or partially contained within the image. If the identified object is fully contained within the image, then the processes may allow cropping or other modification along any of the edges of the image while maintaining all portions of the fully contained, identified object within the image. In contrast, if the identified object is partially contained within the image such that at least a portion of the object is cropped along one or more edges, then the processes may allow cropping or other modification along any of the edges of the image except the one or more edges along which the partially contained, identified object is already cropped.

By the processes described with respect to FIGS. 12A and 12B, images may be accentuated by reducing or eliminating visually distracting portions of the image, such as visibly cropped edges of images, and/or by utilizing all available space of a tile or block within which an image is presented, such that an object of interest represented within the image may be emphasized, magnified, and presented to the user without distracting visual elements.

Figure 13:
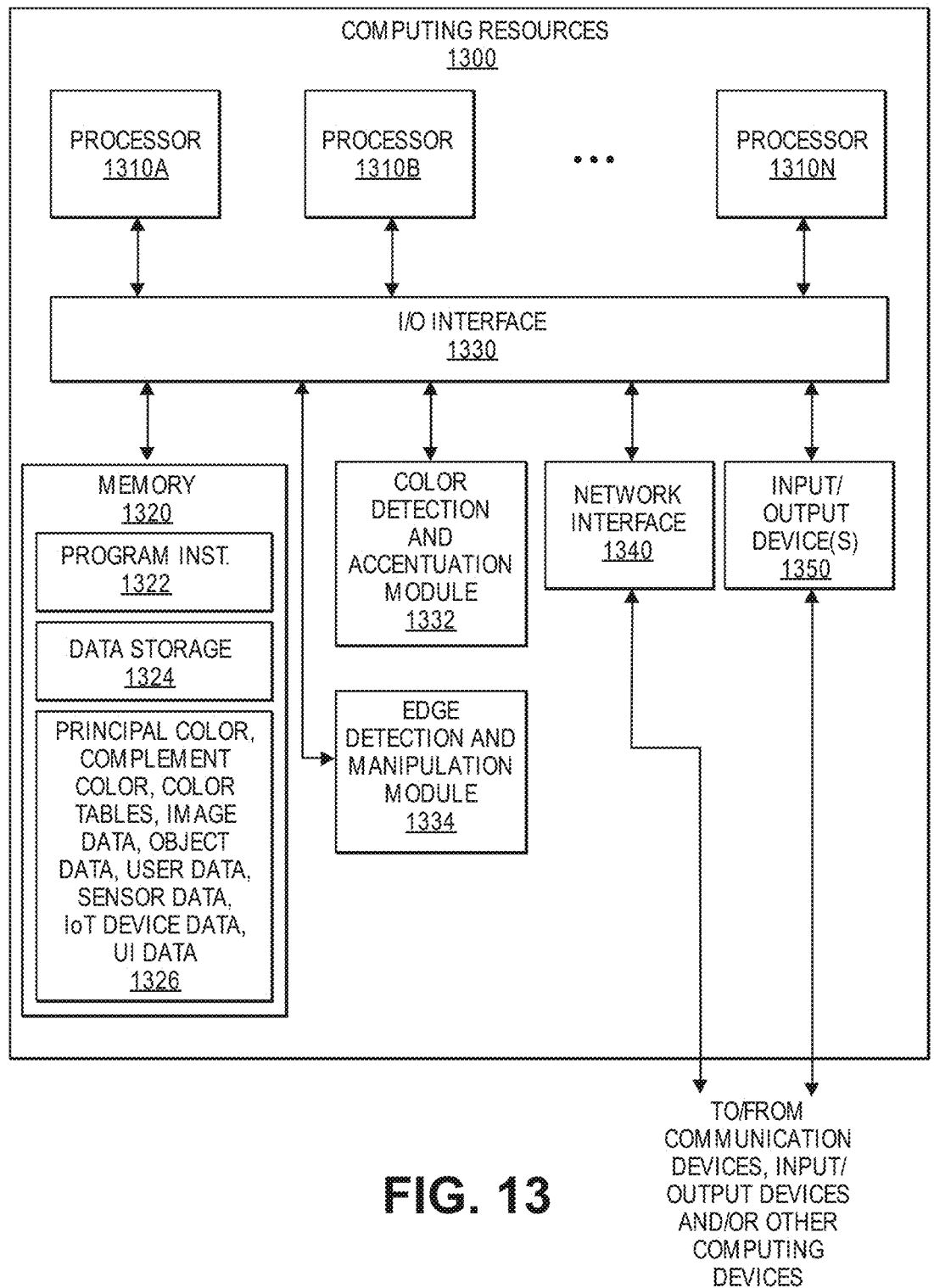
FIG. 13 is a block diagram illustrating various example components of computing resources, according to an implementation.

FIG. 13 is a block diagram illustrating various example components of computing resources 1300, according to an implementation. In various examples, the block diagram may be illustrative of one or more aspects of computing resources 1300 that may be used to implement the various systems and processes discussed above. In the illustrated implementation, the computing resources 1300 includes one or more processors 1310, coupled to a non-transitory computer readable storage medium 1320 via an input/output (I/O) interface 1330. The computing resources 1300 may also include a color detection and accentuation module 1332, an edge detection and manipulation module 1334, a network interface 1340, and one or more input/output devices 1350.

The computing resources 1300 may be included as part of a computing device or system, a display device or system, a smart or connected home device or system, other input/output devices or systems, and/or other computing systems, or combinations thereof. In various implementations, the computing resources 1300 may be a uniprocessor system including one processor 1310, or a multiprocessor system including several processors 1310A-1310N (e.g., two, four, eight, or another suitable number). The processor(s) 1310 may be any suitable processor capable of executing instructions. For example, in various implementations, the processor(s) 1310 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1310 may commonly, but not necessarily, implement the same ISA.

The non-transitory computer readable storage medium 1320 may be configured to store executable instructions, data, principal colors, complement colors, color models, color associations or definitions, color tables, image data, object data, user data, sensor data, environment data, illumination element data, other output element data, connected device or smart home device data, user interface data, computing device or system data, characteristics, and capabilities, display device or system data, characteristics, and capabilities, and/or other data items accessible by the processor(s) 1310. In various implementations, the non-transitory computer readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1320 as program instructions 1322, data storage 1324 and other information and data 1326, respectively. In other implementations, program instructions, data and/or other information and data may be received, sent or stored upon different types of computer-accessible media, such as non-transitory media, or on similar media separate from the non-transitory computer readable storage medium 1320 or the computing resources 1300.

Generally speaking, a non-transitory, computer readable storage medium may include storage media or memory media such as magnetic or optical media, e.g., disk or CD/DVD-ROM, coupled to the computing resources 1300 via the I/O interface 1330. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1340.

In one implementation, the I/O interface 1330 may be configured to coordinate I/O traffic between the processor(s) 1310, the non-transitory computer readable storage medium 1320, and any peripheral devices, the network interface 1340 or other peripheral interfaces, such as input/output devices 1350. In some implementations, the I/O interface 1330 may perform any necessary protocol, timing or other data transformations to convert data signals from one component (e.g., non-transitory computer readable storage medium 1320) into a format suitable for use by another component (e.g., processor(s) 1310). In some implementations, the I/O interface 1330 may include support for devices attached through various types of peripheral buses, such as a variant of the Peripheral Component Interconnect (PCI) bus standard or the Universal Serial Bus (USB) standard, for example. In some implementations, the function of the I/O interface 1330 may be split into two or more separate components, such as a north bridge and a south bridge, for example. Also, in some implementations, some or all of the functionality of the I/O interface 1330, such as an interface to the non-transitory computer readable storage medium 1320, may be incorporated directly into the processor(s) 1310.

The color detection and accentuation module 1332 may perform the processes described herein with respect to determining one or more principal colors within at least a portion of an image, identifying one or more complement colors based at least in part on the determined principal colors, and applying the one or more complement colors to at least a portion of the image. The color detection and accentuation module 1332 may also perform the processes described herein with respect to display and rearrangement or manipulation of a plurality of images having applied complement colors via user interfaces of computing devices and/or display devices, and/or perform the processes described herein with respect to creation or maintenance of a mood or theme within an environment of a user including one or more user interfaces of computing devices and/or display devices upon which images having applied complement colors are displayed, and including one or more sensors, illumination elements, smart home or connected devices, and/or other input/output devices or systems.

The edge detection and manipulation module 1334 may perform the processes described herein with respect to detecting one or more visibly cropped edges within an image, further cropping such images to remove such visually distracting elements, and further altering the magnification, translation, positioning, or other aspects of the image responsive to such further cropping.

The network interface 1340 may be configured to allow data to be exchanged between the computing resources 1300, other devices attached to a network, such as other computer systems, display devices, connected devices, smart home devices, sensors, illumination elements, other input/output elements, and/or other computing resources. For example, the network interface 1340 may enable wireless communication between the computing resources 1300 and one or more display devices that present user interfaces. In various implementations, the network interface 1340 may support communication via wireless general data networks, such as a Wi-Fi network. For example, the network interface 1340 may support communication via telecommunications networks such as cellular communication networks, satellite networks, and the like.

Input/output devices 1350 may, in some implementations, include one or more visual output devices, audio input/output devices, connected devices, smart home devices, input devices such as touchscreens, keyboards, mice, or remote controllers, image capture devices, audio sensors, illumination elements, light sensors, temperature sensors, other sensors described herein, etc. Multiple input/output devices 1350 may be present and controlled by the computing resources 1300.

As shown in FIG. 13, the memory may include program instructions 1322 which may be configured to implement the example processes and/or sub-processes described above. The data storage 1324 and other information and data 1326 may include various data stores for maintaining data items that may be provided for determining principal colors within images, identifying complement colors, applying complement colors to images, controlling input/output elements within an environment, manipulating edges of images, resizing or altering magnifications of images, and any other functions, operations, or processes described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the computing resources 1300 are merely illustrative and are not intended to limit the scope of the present disclosure. In particular, the computing systems and devices may include any combination of hardware or software that can perform the indicated functions, including computers, network devices, internet appliances, PDAs, wireless phones, pagers, etc. The computing resources 1300 may also be connected to other devices that are not illustrated, or instead may operate as stand-alone systems. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the computing resources 1300. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the computing resources 1300 may be transmitted to the computing resources 1300 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other computing resource configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method to accentuate an image displayed via a user interface, comprising:
   identifying at least a portion of an image displayed via a user interface;
   determining a principal color associated with the at least the portion of the image;
   determining a complement color associated with the principal color based at least in part on a table having associations between principal colors and complement colors; and
   modifying the at least the portion of the image with the complement color by adjusting color values of pixels associated with the at least the portion of the image based at least in part on the complement color by:
      determining a difference between red-green-blue (RGB) color values associated with the complement color and RGB color values of a color white; and
      subtracting the difference from RGB color values of each of the pixels associated with the at least the portion of the image.

2. The method of claim 1, wherein identifying the at least the portion of the image comprises recognizing an object within the portion of the image.

3. The method of claim 1, wherein the at least the portion of the image is further modified with the complement color by overlaying a tile having the complement color onto the at least the portion of the image.

4. A method, comprising:
   identifying a principal color associated with at least a portion of an image displayed via a user interface;
   determining a complement color based at least in part on the identified principal color; and
   applying the complement color to at least a portion of the image by adjusting color values of pixels associated with at least the portion of the image based at least in part on the complement color by:
      determining a difference between red-green-blue (RGB) color values associated with the complement color and RGB color values of a color white; and
      subtracting the difference from RGB color values of each of the pixels associated with at least the portion of the image.

5. The method of claim 4, wherein identifying the principal color associated with at least the portion of the image comprises:
   identifying at least one subregion of the image; and
   identifying the principal color associated with the at least one subregion.

6. The method of claim 5, wherein the at least one subregion comprises at least one of a center, a text region, or an interactive element region of the image.

7. The method of claim 4, wherein identifying the principal color associated with at least the portion of the image comprises:
recognizing an object within the image; and
identifying the principal color associated with the object.

8. The method of claim 7, wherein applying the complement color to at least the portion of the image further comprises:
adjusting color values of pixels associated with at least the portion of the image and not associated with the recognized object based at least in part on the complement color.

9. The method of claim 4, wherein determining the complement color based at least in part on the identified principal color comprises:
identifying, with reference to a hue-saturation-lightness (HSL) or a hue-saturation-value (HSV) color model, a color that is 180 degrees from the identified principal color as the complement color.

10. The method of claim 4, wherein determining the complement color based at least in part on the identified principal color comprises:
selecting the complement color by reference to a table having associations between principal colors and complement colors.

11. The method of claim 4, wherein applying the complement color to at least the portion of the image further comprises:
overlaying a tile having the complement color onto at least the portion of the image.

12. A method, comprising:
identifying a principal color associated with at least a portion of an image displayed via a user interface;
determining a complement color based at least in part on the identified principal color; and
applying the complement color to at least a portion of the image;
wherein identifying the principal color associated with at least the portion of the image comprises:
recognizing an object within the image;
identifying the principal color associated with the object;
identifying at least one of a background object or a human body object; and
excluding pixels associated with the at least one of the background object or the human body object from the identifying of the principal color associated with the object.

13. A method, comprising:
identifying a principal color associated with at least a portion of an image displayed via a user interface;
determining a complement color based at least in part on the identified principal color; and
applying the complement color to at least a portion of the image;
wherein identifying the principal color associated with at least the portion of the image comprises identifying principal colors associated with respective ones of a plurality of images displayed via the user interface;
wherein determining the complement color based at least in part on the identified principal color comprises determining complement colors associated with the respective ones of the plurality of images based at least in part on the respective identified principal colors; and
wherein applying the complement color to at least the portion of the image comprises applying the complement colors to the respective ones of the plurality of images; and
the method further comprising:
rearranging at least one of the plurality of images displayed via the user interface based at least in part on respective complement colors applied to the respective ones of the plurality of images.

14. A system, comprising:
a user interface presented via a display device positioned within an environment;
at least one illumination element distinct from the display device, positioned within the environment, and configured to illuminate the environment;
at least one sensor; and
a computing device including a processor and a memory configured to at least:
identify a principal color associated with an image displayed via the user interface;
determine a complement color based at least in part on the identified principal color;
apply the complement color to the image displayed via the user interface;
detect, using the at least one sensor, at least one of a time of day, an ambient light color value, or an ambient light brightness level; and
adjust an illumination color of the at least one illumination element based at least in part on the complement color and the at least one of the time of day, the ambient light color value, or the ambient light brightness level.

15. A system, comprising:
a user interface presented via a display device positioned within an environment;
a plurality of illumination elements distinct from the display device, positioned within the environment, and configured to illuminate the environment; and
a computing device including a processor and a memory configured to at least:
identify principal colors associated with respective ones of a plurality of images displayed via the user interface;
determine complement colors associated with the respective ones of the plurality of images based at least in part on the respective identified principal colors;
apply the complement colors to the respective ones of the plurality of images displayed via the user interface; and
adjust illumination colors of respective ones of the plurality of illumination elements based at least in part on the complement colors applied to the respective ones of the plurality of images displayed via the user interface.

16. The system of claim 15, wherein the computing device is further configured to at least:
receive a selection of one of the plurality of images displayed via the user interface; and
adjust an illumination color of the plurality of illumination elements based at least in part on the complement color applied to the selected one of the plurality of images.

* * * * *